(12) United States Patent
Naess

(10) Patent No.: US 11,134,660 B2
(45) Date of Patent: Oct. 5, 2021

(54) OUTLET BASIN FOR A FISH PEN

(71) Applicant: Akvadesign AS, Bronnoysund (NO)

(72) Inventor: Anders Naess, Bronnoysund (NO)

(73) Assignee: Akvadesign AS, Bronnoysund (NO)

( * ) Notice: Subject to any disclaimer, the term of this patent is extended or adjusted under 35 U.S.C. 154(b) by 946 days.

(21) Appl. No.: 15/862,729

(22) Filed: Jan. 5, 2018

(65) Prior Publication Data

US 2019/0021293 A1 Jan. 24, 2019

Related U.S. Application Data

(62) Division of application No. 14/763,954, filed as application No. PCT/NO2014/050019 on Feb. 5, 2014, now Pat. No. 9,883,660.

(30) Foreign Application Priority Data

| Feb. 5, 2013 | (NO) | .................................... | 20130210 |
| May 6, 2013 | (NO) | .................................... | 20130612 |

(51) Int. Cl.
| *A01K 61/60* | (2017.01) |
| *A01K 63/04* | (2006.01) |
| *E03C 1/264* | (2006.01) |

(52) U.S. Cl.
CPC .............. *A01K 63/04* (2013.01); *A01K 61/60* (2017.01); *E03C 1/264* (2013.01); *Y02A 40/81* (2018.01)

(58) Field of Classification Search
CPC ...... A01K 63/00; A01K 63/04; A01K 63/045; A01K 61/60; E03C 1/264
(Continued)

(56) References Cited

U.S. PATENT DOCUMENTS

| 4,446,646 A | * | 5/1984 | van't Veld | ............. | A01K 77/00 |
| | | | | | 43/12 |
| 4,690,756 A | | 9/1987 | Van Ry | | |

(Continued)

FOREIGN PATENT DOCUMENTS

| CA | 2359515 | 4/2005 |
| CA | 2446084 | 5/2005 |

(Continued)

OTHER PUBLICATIONS

International Search Report and Written Opinion for PCT/NO2014/050019 dated Mar. 18, 2014.

*Primary Examiner* — David J Parsley
*Assistant Examiner* — Danielle A Clerkley
(74) *Attorney, Agent, or Firm* — Andrus Intellectual Property Law, LLP

(57) ABSTRACT

An outlet basin for a fish pen is provided with at least one outlet hose extending from the outlet basin to a surface. The outlet basin includes a cylinder-shaped housing which is provided, at its upper portion, with a mounting collar arranged to be attached to a bottom portion of the fish pen, and which is provided, at its lower portion, with a through opening. The outlet basin further includes a cylinder-shaped outlet channel which, in a portion, is housed in the housing, the outlet channel is provided, at its upper portion, with a strainer covering the cross section of the outlet channel, an elongated annular space between the housing and the outlet channel, a slanted grating covering the entire annular space, the lowermost portion of the slanted grating being positioned just below the opening of the housing, a slanted bottom plate sealingly covering the entire annular space, and a lower through opening at the lowermost portion of the bottom plate.

10 Claims, 24 Drawing Sheets

(58) Field of Classification Search
USPC ...... 4/671–673; 43/7, 14; 119/215, 216, 223
See application file for complete search history.

(56) References Cited

U.S. PATENT DOCUMENTS

| | | | |
|---|---|---|---|
| 4,711,199 A | | 12/1987 | Nyman |
| 4,744,331 A | * | 5/1988 | Whiffin ................ A01K 29/00 |
| | | | 119/223 |
| 4,798,168 A | | 1/1989 | Vadseth et al. |
| 4,894,943 A | * | 1/1990 | Allen .................... A01K 79/00 |
| | | | 43/6.5 |
| 4,909,186 A | | 3/1990 | Nakamune et al. |
| 5,193,481 A | | 3/1993 | Loverich et al. |
| 5,408,770 A | | 4/1995 | Suzuki |
| 5,640,930 A | | 6/1997 | Kirby |
| 5,762,024 A | | 6/1998 | Meilahn |
| 5,800,704 A | | 9/1998 | Hansen |
| 6,082,385 A | | 7/2000 | Burford et al. |
| 6,187,208 B1 | | 2/2001 | White |
| 6,443,100 B1 | | 9/2002 | Brenton |
| 6,904,720 B1 | | 6/2005 | Adolfson et al. |
| 2002/0104487 A1 | | 8/2002 | Brenton |
| 2004/0123809 A1 | * | 7/2004 | Klein .................... A01K 61/60 |
| | | | 119/223 |
| 2006/0207141 A1 | | 9/2006 | Pitt et al. |
| 2009/0172994 A1 | * | 7/2009 | Sloop ..................... A01K 97/05 |
| | | | 43/57 |

FOREIGN PATENT DOCUMENTS

| | | |
|---|---|---|
| CN | 2582372 | 10/2003 |
| CN | 2585554 | 11/2003 |
| CN | 1568676 | 1/2005 |
| CN | 2794168 | 7/2006 |
| DE | 102008056495 | 3/2011 |
| EP | 0347489 | 12/1989 |
| GB | 1518095 | 7/1978 |
| GB | 2080850 | 2/1982 |
| GB | 2200822 | 8/1988 |
| GB | 2482798 | 2/2012 |
| NO | 160752 | 2/1989 |
| NO | 160753 | 2/1989 |
| NO | 882829 | 12/1989 |
| NO | 165783 | 1/1991 |
| NO | 166511 | 4/1991 |
| NO | 922164 | 12/1993 |
| NO | 175082 | 5/1994 |
| NO | 175341 | 6/1994 |
| NO | 300002 | 3/1997 |
| NO | 318527 | 4/2005 |
| NO | 327035 | 4/2009 |
| NO | 331196 | 10/2011 |
| NO | 332341 | 9/2012 |
| NO | 332589 | 11/2012 |
| NO | 20111704 | 6/2013 |
| SE | 507910 | 7/1998 |
| WO | 8809615 | 12/1988 |
| WO | 9001872 | 3/1990 |
| WO | 9117653 | 11/1991 |
| WO | 9323994 | 12/1993 |
| WO | 9402005 | 2/1994 |
| WO | 2006000042 | 1/2006 |
| WO | 2010016769 | 2/2010 |
| WO | 2010082834 | 7/2010 |
| WO | 2010099590 | 9/2010 |
| WO | 2011133045 | 10/2011 |
| WO | 2013085392 | 6/2013 |
| WO | 2014000102 | 1/2014 |

\* cited by examiner

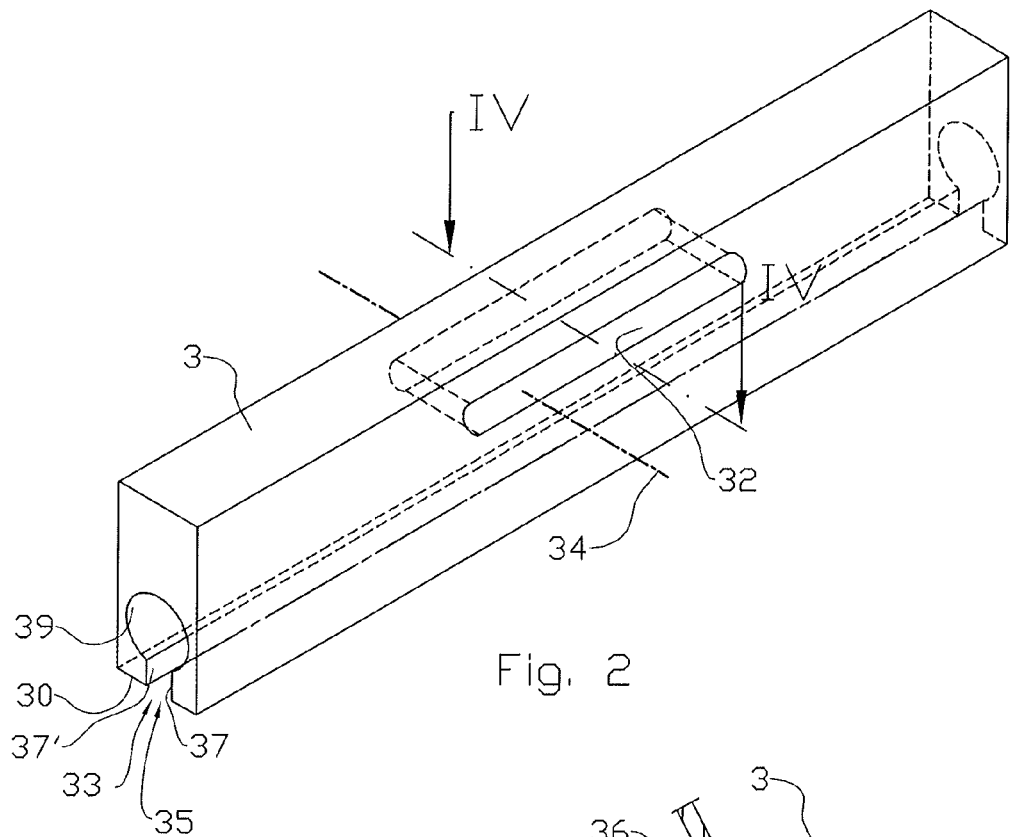
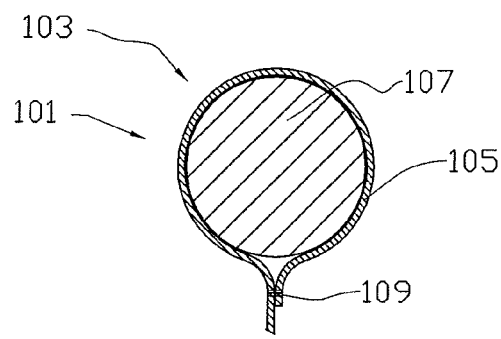
Fig. 3
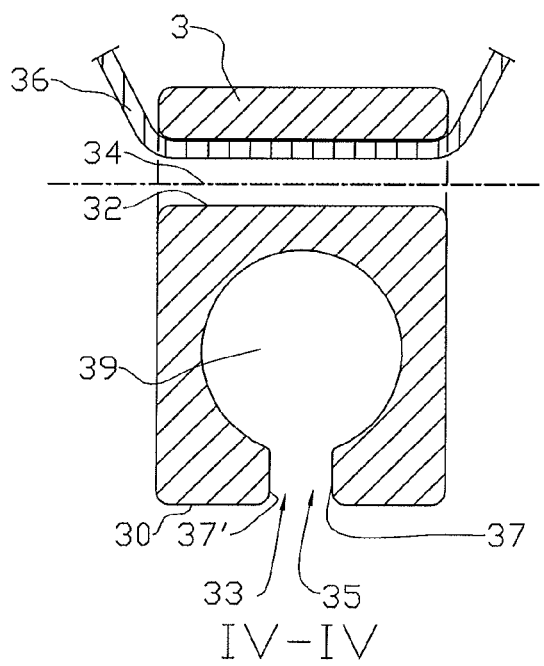
Fig. 2
Fig. 4

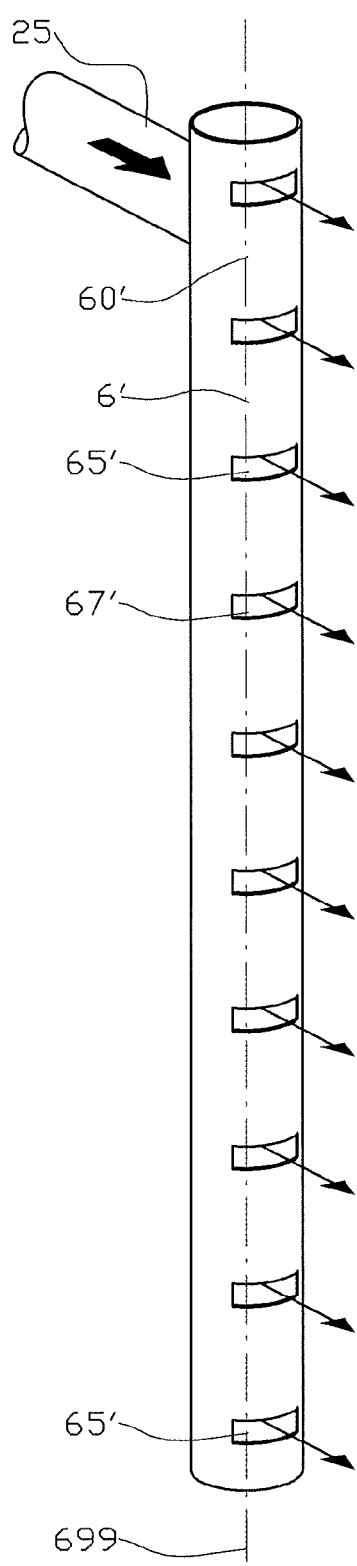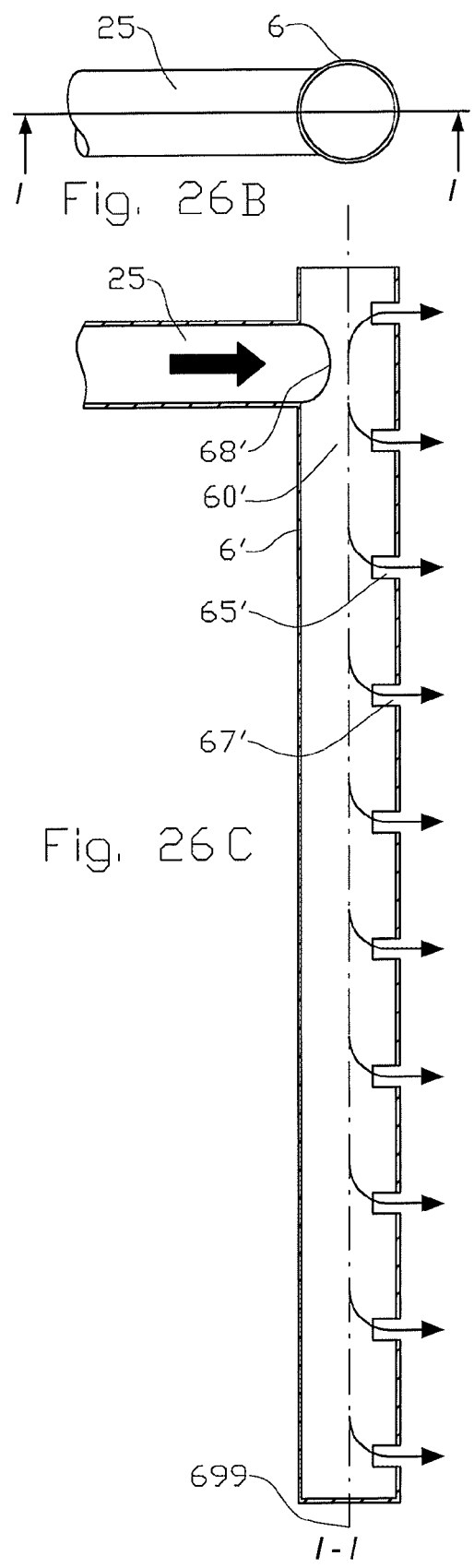
Fig. 26A
Fig. 26B
Fig. 26C

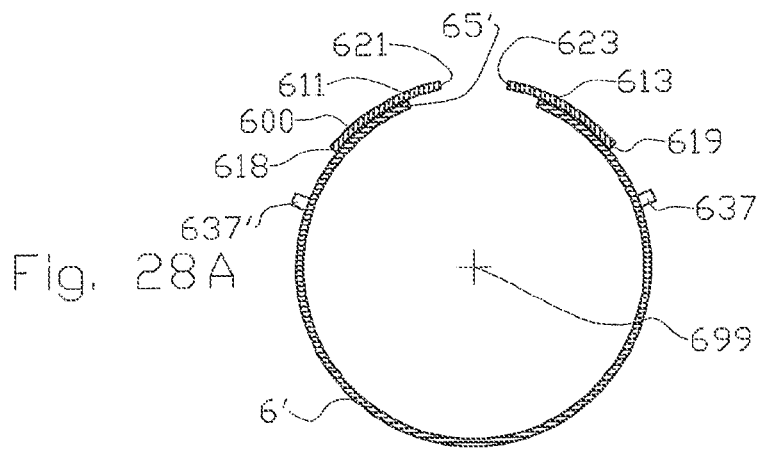
Fig. 28A  //-//
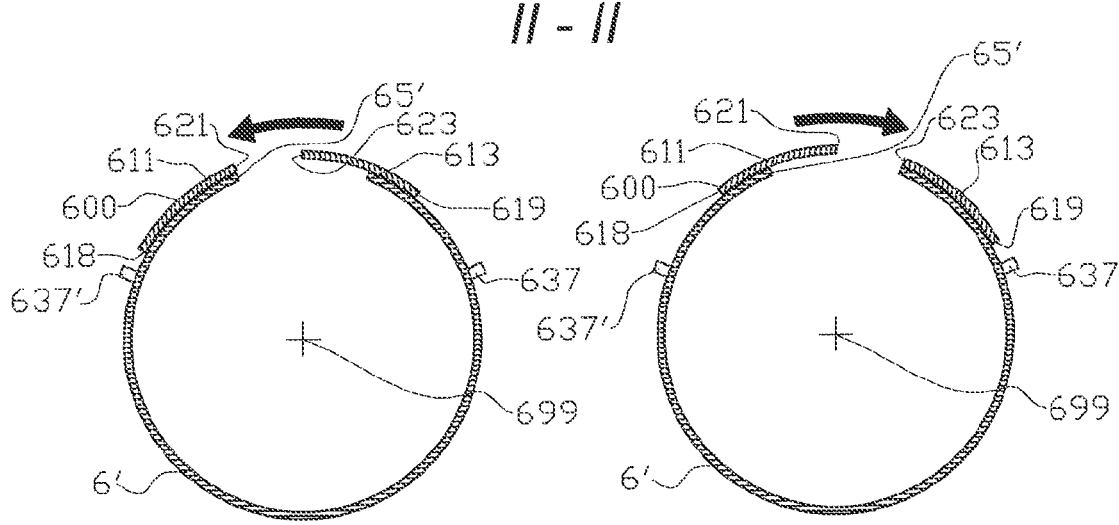
Fig. 28B  //-//     Fig. 28D  //-//
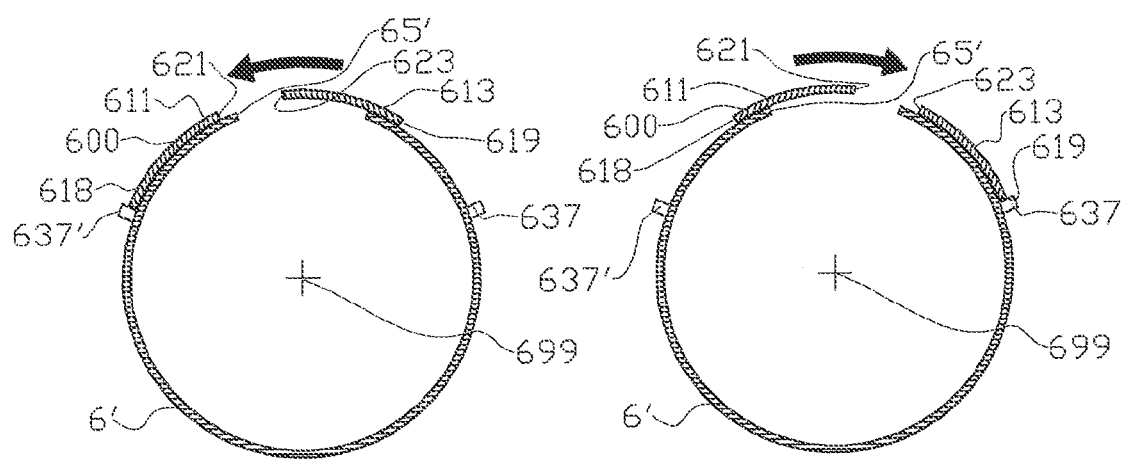
Fig. 28C  //-//     Fig. 28E  //-//

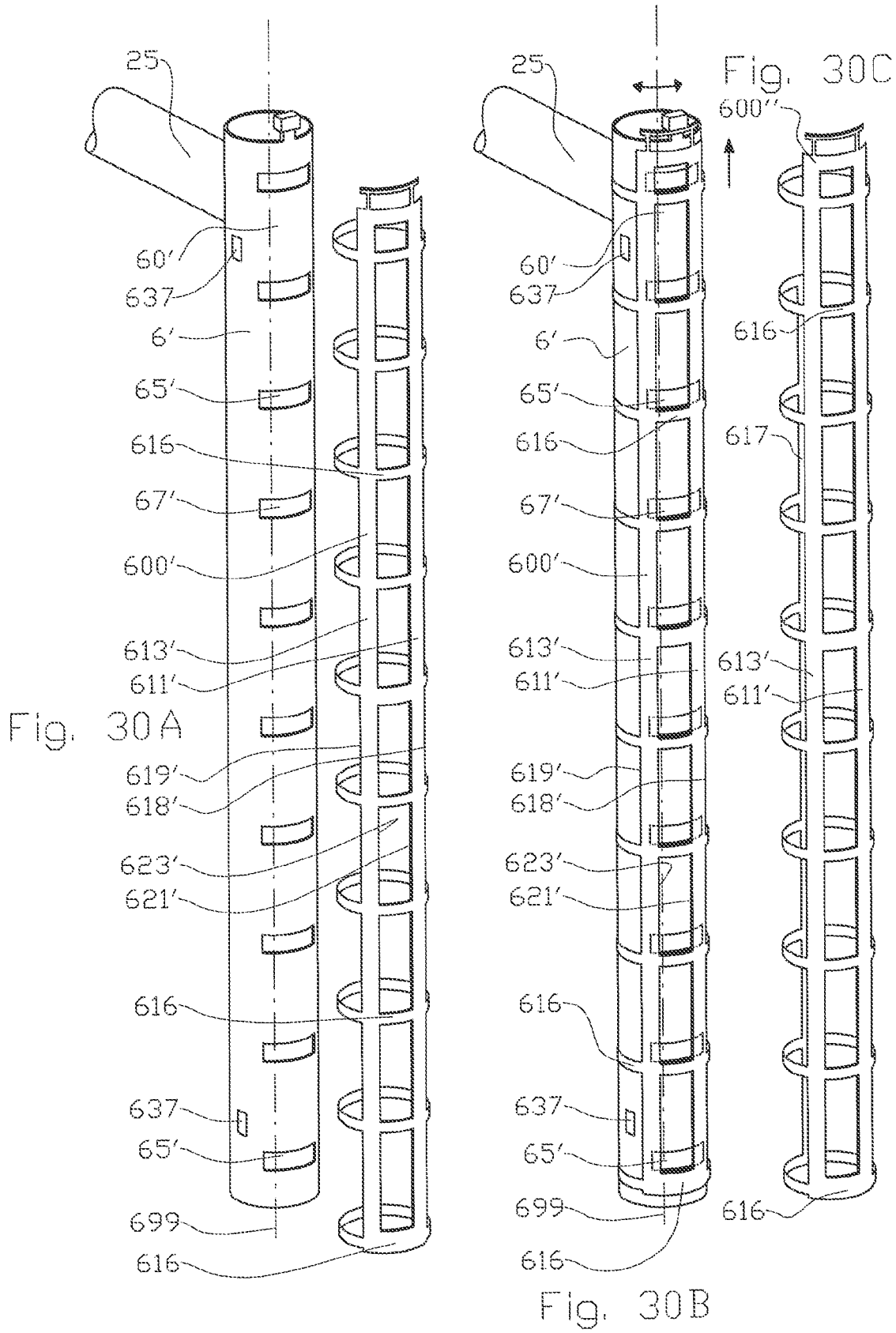

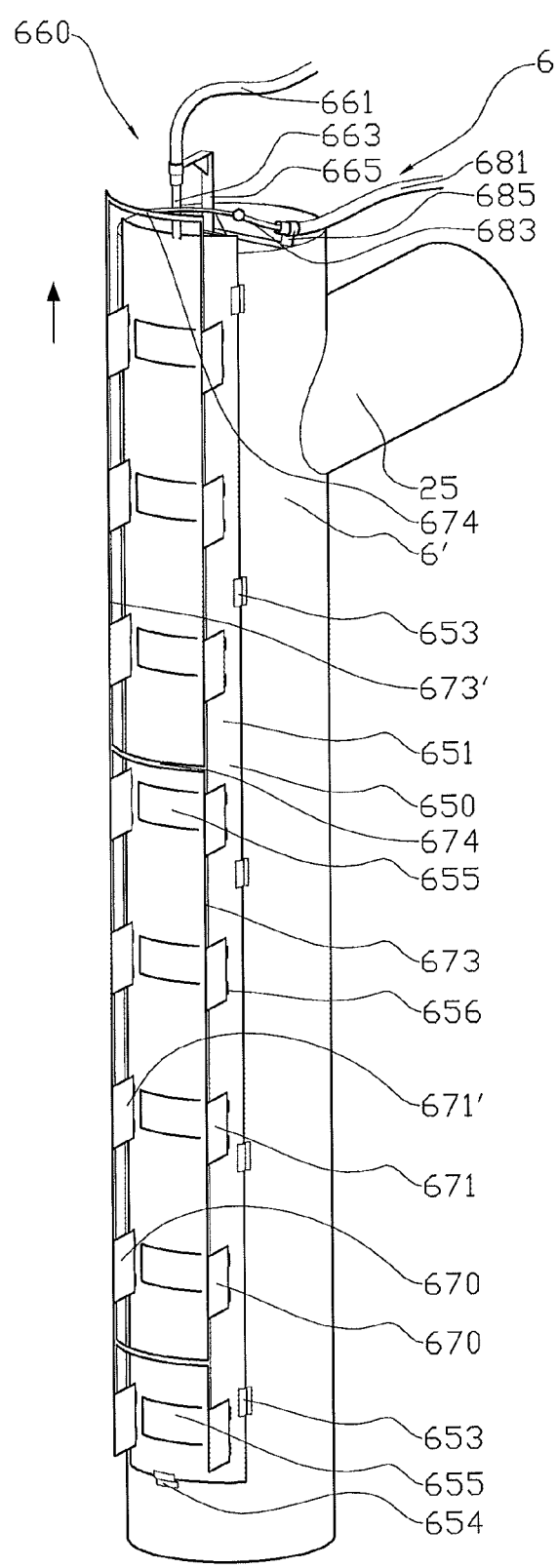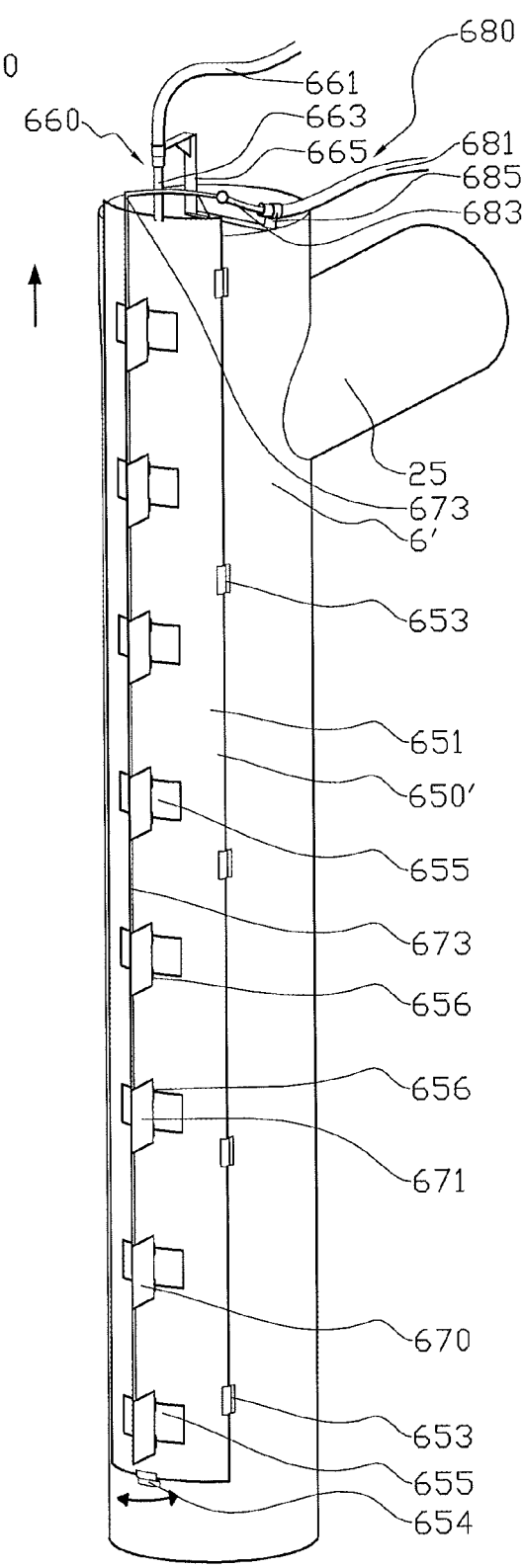

OUTLET BASIN FOR A FISH PEN

CROSS-REFERENCE TO RELATED APPLICATIONS

This application is a divisional application of U.S. patent application Ser. No. 14/763,954, filed Jul. 28, 2015 which '954 application is the U.S. national stage application of International Application PCT/NO2014/050019, filed Feb. 5, 2014, which international application was published on Aug. 14, 2014, as International Publication WO2014/123427 in the English language. The international application is incorporated herein by reference, in entirety. The international application claims priority to Norwegian Patent Application No. 20130210, filed Feb. 5, 2013, and Norwegian Patent Application No. 20130612, filed May 6, 2013, which are incorporated herein by reference, in entirety.

FIELD

The invention relates to an outlet basin for a fish pen which is used for farming fish. More specifically, the invention concerns an outlet basin which separates particulate material and guides this to a first outlet hose, and which separates dead fish and guides these to a second outlet hose.

BACKGROUND

The farming of fish in the sea conventionally takes place in so-called open fish pens. An open fish pen includes a net forming a closed enclosure for the fish, allowing through flow. The fish pen is kept afloat with the aid of an encircling buoyancy system.

Open fish pens have some drawbacks. For the farming of salmon, it is a drawback that fish become infected with crustacean parasites, such as salmon louse, and with other diseases owing to viruses, bacteria and parasites. The fish escape, especially when tears are formed in the net by accident. An open fish pen discharges waste products such as feed not eaten and faecal matter into the recipient. The water temperature within the fish pen follows the temperature of the surrounding water. In the winter, the water temperature, especially near the surface, may be too low for the fish to grow optimally. In the summer, the water temperature may be too high for the fish to grow optimally.

A closed fish pen is an alternative to an open fish pen, and a closed fish pen solves some of the problems connected to an open fish pen. Closed farming fish pens are known within the art. They may be formed from a tight cloth material forming a bag. The patent publication NO160752/U.S. Pat. No.4,711,199 discloses an example of such a fish pen. The fish pen is provided with a substantially flat bottom, the bottom being provided with a conically shaped sludge collector. The patent publication U.S. Pat. No. 4,798,168 discloses a cylinder-shaped fish pen in a material in cloth form with a cone-shaped bottom. Water is guided tangentially in at the surface of the fish pen, and an outlet has its inlet portion positioned in the water surface at the center of the fish pen. Faecal matter and feed leftovers are collected in the lowermost portion of the bottom and pumped up to the surface via a pipe. A flexible suction pipe of a corrugated plastic pipe, for example, is attached to the inlet of the fish pen. At its free end, the flexible suction pipe is provided with a rope extending up to the surface. As the suction pipe is flexible, the free end may be lifted or lowered to the desired water depth. The length of the suction pipe is constant.

Closed fish pens formed from a rigid material are known as well. The patent publication NO 166511/EPO347489 discloses a semi-submersible floating platform which includes cylindrical silos provided with a cone-shaped lower portion. The patent publication NO 165783/U.S. Pat. No. 4,909,186 discloses a hull-shaped container for fish. The patent publication WO2010/016769 discloses a fish pen in a water-tight and substantially rigid material, the fish pen being substantially hemispherical. The patent publication states that the depth of a water inlet can be adjusted to have as optimum a water temperature as possible. The patent document WO2010/099590 discloses a fish pen composed of watertight fibreglass panels with an intermediate foam material to provide buoyancy. The fish pen is substantially cylinder-shaped with a flat bottom.

The patent publication NO 175341/WO9402005 discloses a closed fish pen with a cylindrical upper part and a conical lower part. The fish pen may consist of steel, concrete or a soft, reinforced plastic cloth. Water is pumped into the fish pen at the upper portion of the fish pen through a horizontal supply pipe. In its end portion inside the fish pen, the supply pipe is provided with a rotatable outlet to be able to direct inflowing water in a desired direction horizontally and vertically. In its lower portion, the conical lower part of the fish pen is provided with a funnel-shaped outlet. In a portion of the wall, the outlet is provided with a grid which holds back the fish, but which lets outflowing water pass. The outlet is further provided with static guide vanes to brake the approximately circular movement of the water in the fish pen into an approximately vertical downward movement.

Buoyancy systems for floating farming fish pens may consist of rectangular walkways in steel which are provided with floating bodies. The walkways are hinged together. The walkways form a grid of longitudinal and transverse walkways. Such a buoyancy system is usually used together with open fish pens. The seine, which forms the enclosure for fish, is placed in a square and secured to the encircling walkways on hooks projecting from separate poles or supports. The buoyancy system may also consist of at least one plastic pipe which is welded together into a ring. Usually, the buoyancy system consists of two concentric rings side by side, as shown in the patent publications WO 90/01872 and WO 91/17653, for example. Plastic fish pens having three concentric plastic rings are known as well. The plastic rings are connected by radially oriented clamps in plastic or steel. Walkways may be placed on top of two concentric rings. In an open fish pen, the seine is placed within the innermost pipe of the buoyancy system and is secured with projecting seine hooks. The seine hooks may be secured to the pipe or to a railing projecting up from the buoyancy system. The circumference for the seine in a plastic fish pen may be between 90 m and 160 m, for example, corresponding to a diameter of approximately between 30 m and 50 m.

Known closed fish pens solve some of the drawbacks connected to an open fish pen. The known closed fish pens have some drawbacks as well.

To ensure that the water exchange rate is sufficient to maintain a good water environment within the fish pen, it is usual to pump in so much water that the water surface within the fish pen is higher than the water surface outside the fish pen. Thereby the pressure inside the fish pen is greater than the surrounding pressure, and water will flow out of the fish pen through formed openings. This subjects the buoyancy system of a closed fish pen to greater forces than the buoyancy system of an open fish pen of the same size. In addition to keeping the actual cloth or net of the fish pen afloat, the buoyancy of the buoyancy system must be dimensioned for holding the amount of water inside the fish pen that is above the water surface of the surrounding water. This water constitutes a considerable mass. In addition, this water has a moment of inertia that makes the wave influence on the buoyancy system greater than in an open fish pen in which the wave motion passes the buoyancy system and into the fish pen substantially unobstructedly. As mentioned, the walls of closed fish pens may include a material in cloth form. Owing to the fact that the amount of water within the fish pen gives negative buoyancy, the material in cloth form must have great tear strength. A material in cloth form cannot be attached to the buoyancy system in the same way as a seine. A perforation of the material in cloth form will impair the tear strength. The hole may be reinforced with a grommet, but it is difficult to match the spacing of a plurality of holes to a plurality of hooks in such a way that the cloth is kept smooth. The water pressure inside the fish pen will stretch the cloth, while too short distances between the hooks will create folds. Too wide a spacing of the hooks in relation to that of the holes formed makes it impossible for one or more of the hooks to be used. This impairs the strength of the attachment of the fish-pen cloth to the buoyancy system.

Over time, a thin sludge will form inside a closed fish pen. The sludge consists of faecal matter and small feed particles. The feed particles are fatty. This sludge has poor settling properties. In fish pens with approximately flat bottoms, whether they have substantially cylindrical side walls or are ball-shaped, this sludge will lie along the bottom and only slowly creep in towards the center of the fish pen. The outlet of the fish pen is usually positioned at the center of the bottom. The sludge forms a pool which catches further faecal matter and feed leftovers and prevents them from being carried towards the outlet. The rate of the water flowing through may be increased to carry the sludge towards the outlet, but experience has shown that this may make the sludge dissolve and get mixed into the water within the fish pen again, especially if the water flow is somewhat turbulent and deviates from the desired laminar flow. When an oxygenation system is used, with a supply of gas bubbles near the outlet of the fish pen, the particles of the sludge will easily be carried all the way to the water surface within the fish pen. Sludge dissolved in the water creates cloudy water and gives bad water quality for the fish. Fish that die will sink towards the bottom of the fish pen and will start to rot there if not removed. Mortality may be due to disease caused by pathogenic organisms, and it is important to remove dead fish quickly in order to reduce any infection pressure on the fish in the fish pen. The patent publication NO332341/WO2011133045 discloses a closed fish pen with a cone-shaped bottom. In one embodiment, all the waste water is brought up to a sludge tank which is positioned on the floating collar of the fish pen. In an alternative embodiment, feed leftovers and faecal matter are partially separated from the water at the bottom of the fish pen. The waste water is carried up to the sludge tank, whereas feed leftovers and faecal matter are carried up to the surface in a separate outlet pipe. The patent publication NO175082/WO9323994 discloses an outlet for vessels on land. The vessels are arranged for farming fish and are provided with relatively flat bottoms. A primary water flow and a secondary water flow carry particles in the water in towards the center of the vessel. At the center of the vessel, the waste water moves out through a slot and into a circular particle trap formed as an annular space around the outlet pipe. The water flows out of a row of holes in the outlet pipe, whereas deposited material is moved by the water flow through a slot opening and down into a particle outlet. The patent publication NO318527/U.S. Pat. No. 6,443,100 discloses an outlet for a closed fish pen. An outlet pipe extends through the bottom portion of the fish pen and projects upwards in the fish pen. The water flows out of the fish pen through a slot in the upper portion of the outlet pipe. Deposited material sinks down along the outside of the outlet pipe and is carried out of the fish pen through an opening in the fish pen at the outlet-pipe lead-through in the fish pen.

Water will have to be pumped into a closed fish pen because the pressure inside the fish pen is greater than that on the outside. The inflowing water creates currents within the fish pen. The currents should be such that the entire water volume is replaced regularly. Ideally, the flow should be laminar and run evenly from the inlet to the outlet. The patent publication NO 160753 discloses an inlet for a floating tank or a land-based tank, in which the water is carried into the tank through a pipe through the wall of the tank. On the inside of the tank, the water is carried through a vertically oriented nozzle device with fixed nozzles that let the inflowing water have a tangential component. The vertical nozzle device may be positioned with a horizontal distance to the wall of the vessel. The patent publication WO 2006/000042, too, discloses a vertically oriented nozzle device on the inside of a floating tank. The inflowing water gets a tangential component. The water is carried into the tank through a pipe through the wall of the tank. The patent publication U.S. Pat. No. 5,762,024, too, discloses a vertically oriented nozzle device on the inside of a floating tank. The water is carried into the tank from above, and the nozzle openings are positioned in the lower portion of the nozzle device. The water gets a circular flow in the tank. The flow rate of the water is adjusted by changing the speed of the pump. The nozzle devices described in these three patent publications are fixed so that the direction of flow of the water out of the nozzle device is constant. The patent publication NO 332589 discloses a floating tank with a vertically oriented nozzle device as well. The nozzle device is preferably provided with directionally adjustable slots or nozzles. NO 332589 does not show how this is to be done in practice. NO 332589 also discloses that the nozzle device may consist of an outer pipe and an inner pipe which can be rotated, lifted and lowered relative to each other in a controlled manner. In this way, the amount, direction and level of the inflowing water may be adjusted. NO 332589 does not show in detail how this is to be done. NO 332589 also discloses water intake pipes arranged telescopically. The lengths of the pipes, and thereby the depth of the inlet opening, may be adjusted with a wire extending through the pipe and being attached to the lower portion of the pipe. The patent publication NO 327035 discloses a nozzle device for a land-based tank. The nozzle device includes a vertically oriented, fixed distributor pipe. The distributor pipe is provided with a number of nozzle openings along the longitudinal direction of the distributor pipe. The nozzle openings extend axially in a slit shape with a length exceeding the width by a factor of 2 at least. A damper member provided with holes can be displaced axially along the distributor pipe. The damper member is provided with a number of slit openings corresponding to the slit openings of the distributor pipe.

As mentioned in the foregoing, the water within a closed fish pen may have a water surface above the water surface of the surroundings of the fish pen. The water within the fish pen may have been pumped up from a water depth at which the salinity of the water is greater than the salinity of the water on the outside of the fish pen. The water within the fish pen thereby has a greater density than the surrounding water. It has turned out that on a loss of the electrical power driving the pumps supplying the fish pen with water, the water will first flow out of the fish pen, until the water surface within the fish pen is level with the water surface on the outside of the fish pen. If the water within the fish pen has a greater density than the surrounding water, the water will continue to flow out of the fish pen. The water on the outside of the fish pen may flow past the fish pen at a relatively great velocity. It has turned out that once a water flow out of the fish pen has been established, it may be maintained by the water that is flowing past on the outside. A closed fish pen that includes walls in a material in cloth form will be extended when the pressure within the fish pen is greater than the pressure on the outside of the fish pen. When the water begins to flow out of such a closed fish pen, the walls of the bag will start to collapse. This will happen especially in the lower portion of the fish pen while the upper portion of the fish pen is kept in shape by the buoyancy system of the fish pen. The fish pen will thereby get a reduced volume and this has a stressful effect on the fish in the fish pen.

The water may be carried out of a closed fish pen by an outlet in the bottom portion of the fish pen. The outlet opening must be secured with a grating or the like, to prevent fish in the fish pen from escaping from the fish pen through the outlet. Over time, such a grating will become covered in sludge. The grating will also become fouled with, for example, shells and tunicates. The inside of the closed fish pen will also be fouled. Such fouling can be removed by washing. This leads to relatively large amounts of material sinking down towards the outlet and settling on the grating. The grating may thus partially become clogged up with sludge, fouling and material from the wall of the fish pen. As the grating partially clogs up, the water flow resistance out of the outlet will become larger. This is counteracted by the water column over the grating becoming larger. This is to say, the level of the water surface within the fish pen rises relative to the water surface of the surrounding water. This in turn increases the load on the buoyancy system. As illustrative dimensions it may be indicated that a water-level increase of 1 cm within a closed fish pen may result in the buoyancy system being lowered 7-8 cm further down in the water.

A substantial amount of water will have to be pumped into a closed fish pen to maintain a good water environment for the fish. The water may advantageously be pumped up from a depth at which the water temperature is more constant than at the surface. This also has the advantage of the fish being exposed to smaller amounts of parasites as these are usually located in the upper water layers. A supply channel with a large diameter has the drawback of the underpressure in the supply channel possibly making the wall of the channel collapse. This can be counteracted by increasing the wall thickness. The pipe will thereby be more rigid. A rigid pipe has the drawback of water currents pressing harder against the pipe. In particular the attachment of the pipe to the pump housing and the attachment of the pump housing to the buoyancy system of the fish pen will thereby be subjected to an increased strain.

SUMMARY

The invention has for its object to remedy or reduce at least one of the drawbacks of the prior art or at least provide a useful alternative to the prior art.

The object is achieved through features which are specified in the description below and in the claims that follow.

The invention relates to an outlet basin for a fish pen provided with at least one outlet hose extending from the outlet basin to a surface, the outlet basin including:
a cylinder-shaped housing which, at its upper portion, is provided with a mounting collar arranged to be attached to a bottom portion of the fish pen, and which, at its lower portion, is provided with a through opening;
a cylinder-shaped outlet channel housed in the housing, the outlet channel being provided, in its upper portion, with a strainer covering the cross section of the outlet channel;
an elongated annular space between the housing and the outlet channel;
a slanted grating covering the entire annular space, the lowermost portion of the slanted grating being positioned just below the opening in the housing;
a slanted bottom plate sealingly covering the entire annular space; and
a lower through opening at the lowermost portion of the bottom plate.

The outlet channel may be fixed to the housing by means of at least one of the grating and the bottom plate. The grating may include a plurality of ribs oriented side by side. Alternatively, the grating may comprise a sieve plate. The bottom plate may comprise a fine-meshed material. The opening may lead into a first pipe socket arranged to be connected in a sealing manner to a first outlet hose. The lower through opening may be positioned in the bottom plate at the lowermost portion of the bottom plate at the inner jacket of the housing. The lower through opening may be positioned in the jacket of the housing in a portion between the lowermost portion of the grating and the lowermost portion of the bottom plate.

The lower opening may lead into a second pipe socket arranged to be connected in a sealing manner to a second outlet hose. The strainer may have a conical shape and the point of the strainer may face upwards. In an alternative embodiment, the strainer may include a top plate, and between the outer edge of the top plate and the edge of the outlet channel, a plurality of ribs may extend side by side so that, between the ribs, elongated openings forming straining slots are formed. The ribs may consist of pipes.

A buoyancy system for a floating fish pen for farming fish is described as well, wherein the buoyancy system may include at least two concentric rings, wherein at least two of the at least two concentric rings may have substantially the same diameter, and the first of the at least two concentric rings may be loosely positioned over the second one of the at least two concentric rings. At least two of the at least two concentric rings may have substantially the same diameter.

A plurality of elongated plates may be attached in at least one end portion to one of the at least two concentric rings, and the plates may extend at least around a portion of the other one of the at least two concentric rings. The plates may be attached to the lower one of the two concentric rings and may extend at least around a portion of the upper one of the two concentric rings. A railing may be attached to the upper one of the two concentric rings.

A suspension means for the attachment of a bag in a closed fish pen to a buoyancy system is described as well, wherein, in a side edge, the suspension means may be provided with:
a groove formed between two opposite lips that form an elongated mouth portion extending from the edge to an elongated cavity in the suspension means, the diameter of the cavity being larger than the distance between the two opposite lips; and a through opening which has a longitudinal axis extending substantially perpendicularly to the longitudinal direction of the cavity, the through opening being positioned above the cavity in the position of application, so that the suspension means may be displaceably attached to a bulb formed at the upper edge of the bag.

A bag which may be provided with a bulb in portions of an upper edge for releasable positioning in a longitudinal cavity in a suspension means is described as well. The bulb may be formed along the entire encircling upper edge of the bag. The bulb may be formed by the cloth of the bag having been folded around an elongated body and attached to itself by means of a fastening means.

A suspension means is also described, wherein the suspension means may include a female part and a male part, wherein the female part may include:

an end edge and a coupling side;
an elongated hollow profile positioned on the coupling side;
a lip extending from the hollow profile to the end edge; and
an elongated groove positioned on the coupling side, side by side with the hollow profile, the groove including an outer mouth portion facing out towards the coupling side and an internal cavity, the diameter of the cavity being larger than the width of the mouth portion; and the male part may include:
an end edge and a coupling side;
an elongated hollow profile positioned on the coupling side;
a lip extending from the hollow profile to the end edge; and
an elongated, projecting guide positioned on the coupling side, side by side with the hollow profile, the guide including a head portion and a neck, the head portion and the neck complementarily fitting the cavity and the mouth portion, respectively, of the female part, and being such that the diameter of the head is smaller than the diameter of the cavity and larger than the width of the mouth portion so that the cavity of the female part can be moved sideways onto the head portion of the male part to releasably connect the male part and the female part, and so that the hollow profile of the female part and the hollow profile of the male part together form an elongated cavity between themselves.

The suspension means may further be provided with an opening which has a longitudinal axis that extends substantially perpendicularly to the longitudinal direction of the cavity, and the opening may be positioned above the cavity in the position of application.

The female part may be provided with a through opening from an outer side surface to the coupling side, and the female part may be provided with a through opening from an outer side surface to the coupling side so that when the through opening of the female part coincides with the through opening of the male part, a through opening is formed from the outer side of the female part to the outer side of the male part.

The male part may be provided with at least one through bore extending from one end face of the male part to an opposite end face, and an opening may have been formed from the outer side of the male part to the through bore, so that a bolt may be positioned in the bore and a fastening member may be passed around the bolt from the opening. A screw or a set screw which may be oriented perpendicularly to the coupling side may be arranged to lock the male part and the female part to each other so that the male part cannot move sideways relative to the female part and vice versa.

A closed fish pen is described as well, in which the wall may include a fluid-tight material, the fish pen may be provided, in an upper portion, with buoyancy means in a water surface and with an inlet for water, and the fish pen may be provided, in a lower portion, with an outlet; in which the depth of the fish pen constitutes the distance from the water surface to the outlet, the wall in the upper portion of the fish pen may be formed in a spherical shape and the wall in the bottom portion of the fish pen may be formed in a conical shape.

The conical portion of the fish pen may exhibit a depth $(D_C)$ which constitutes substantially one half of the depth (D) of the fish pen. The conical portion of the fish pen may alternatively exhibit a depth $(D_C)$ which constitutes substantially one fourth of the depth (D) of the fish pen. The conical portion of the fish pen may exhibit a depth $(D_C)$ which constitutes substantially between one half and one fourth of the depth (D) of the fish pen. The conical portion of the fish pen may meet the spherical portion of the fish pen tangentially.

A guard net for a closed fish pen which includes a wall in a soft material in cloth form is described as well, wherein the guard net may include:

a plurality of substantially horizontal straps side by side;
a plurality of vertical straps, each extending at least from one horizontal strap to a horizontal neighbouring strap, and the vertical strap being attached to the horizontal strap;
wherein a plurality of the vertical straps extend from the upper portion of the guard net to the lower portion of the guard net;
the upper portion of the guard net being provided with means for adjustably attaching the guard net to the buoyancy system of the fish pen;
the lower portion of the guard net being provided with means for attaching the guard net to the lower portion of the fish pen; and
the guard net may be positioned on the outside of the closed fish pen.

Each horizontal strap may form a ring. In their longitudinal directions, the horizontal and vertical straps of the guard net may be matched to the outer geometry of the closed fish pen. The means of attachment of the guard net to the buoyancy system may be arranged for vertical tightening or vertical slackening of the guard net relative to the buoyancy system. The horizontal and vertical straps may include broad bands.

An inlet system for a closed fish pen is described as well, the fish pen being provided with an encircling buoyancy system and the fish pen being provided with an outlet in its lower portion; the inlet system may comprise:

a pump in a pump housing;
an external supply channel which, at its upper portion, leads into the inlet of the pump; and
a guiding channel which, at its external end, is in fluid communication with the outlet of the pump and which, at its opposite, internal end, projects into the fish pen, wherein, on the inside of the fish pen, the inlet system may further include an elongated current-creation pipe which is rotatable around its longitudinal axis, and wherein the current-creation pipe is in fluid communication with the guiding channel, and wherein the current-creation pipe may be provided with a plurality of openings arranged in at least one row of holes.

In its upper end portion, the current-creation pipe may be rotatably positioned in a sleeve which is in fluid communication with the guiding channel, and the current-creation pipe is provided with an ovally shaped opening in its wall for fluid communication with the sleeve. In its upper end portion, the current-creation pipe may be provided with an operating means arranged to rotate the current-creation pipe around its longitudinal axis. At its upper end portion, the current-creation pipe may be provided with an upper stop ring and a lower stop ring which are positioned, respectively, above and below the sleeve.

A current-creation pipe for a vessel or for a closed fish pen is described as well, the current-creation pipe being positioned on the inside of the vessel or fish pen, the current-creation pipe being provided with:
an opening in the upper portion of the current-creation pipe for fluid communication with a guiding channel which is attached to the upper portion;
a plurality of through openings in the surface of the current-creation pipe, arranged in a row of holes that extends in the longitudinal direction of the current-creation pipe;
a damper member displaceable relative to the current-creation pipe;
and the openings having a length along the circumference of the current-creation pipe which is the same as or larger than the width of the openings in the longitudinal direction of the current-creation pipe.

By displaceable is meant that the damper member may be displaceable along the current-creation pipe in the longitudinal direction of the current-creation pipe. By displaceable is also meant that the damper member may be rotatable around the longitudinal axis of the current-creation pipe. By displaceable is meant that the damper member may be displaceable along the current-creation pipe in the longitudinal direction of the current-creation pipe and rotatable around the longitudinal axis of the current-creation pipe.

The damper member may be rotatable around the longitudinal axis of the current-creation pipe, and the damper member includes a first side plate and a second side plate, both extending in the longitudinal direction of the current-creation pipe and there being transverse plates holding the first side plate and the second side plate together. The distance between the opposite edges of the side plates may be shorter than the width of the opening. The damper member may be positioned on the inside of the current-creation pipe.

The damper member may be displaceable along the longitudinal direction of the current-creation pipe, and the damper member is provided with a plurality of belly bands that extend around the circumference of the current-creation pipe, holding the first side plate and the second side plate together, wherein one side edge of the belly band or a transverse plate between the first side plate and the second side plate substantially coincides with one side edge of the opening when the damper member is in an open position. The number of belly bands and transverse plates may equal the number of openings. The width of the belly band or the transverse plate in the longitudinal direction of the current-creation pipe may be larger than the width of the opening. The damper member may further be provided with a bracing plate extending in the longitudinal direction of the current-creation pipe, the bracing plate connecting the belly bands.

The damper member of the current-creation pipe may include a plate provided with openings corresponding to the openings of the current-creation pipe in shape and number;
the damper member may be displaceable along the longitudinal direction of the current-creation pipe;
the damper member may be provided with one row of rudders in the longitudinal direction of the damper member, each rudder being hinged to the plate, and each rudder being connected, at its free end, to a rod; and
each rudder may project over the middle portion of the opening of the plate.

The damper member of the current-creation pipe may include a plate provided with openings corresponding to the openings of the current-creation pipe in shape and number;
the damper member may be displaceable long the longitudinal direction of the current-creation pipe;
the damper member may be provided with two rows of rudders in the longitudinal direction of the damper member, each rudder being hinged to the plate, and each rudder being connected at its free end to a rod; and
a first row of rudders may be attached at one side of the opening of the plate and a second row of rudders may be attached at the opposite side of the opening of the plate;
the rod of the first row of rudders may be connected to the rod of the second row of rudders by a tie bar.

A strainer regulator for a strainer in a closed fish pen is described as well, the strainer covering the cross section of an outlet channel in an outlet basin at the bottom of the fish pen, wherein the strainer regulator may include:
a regulator sleeve displaceably positioned on the outside of the strainer; and
a control mechanism displacing the regulator sleeve.

The control mechanism may include an actuator which is attached to the regulator sleeve, the actuator extending from the regulator sleeve through the strainer, through the outlet channel to a water surface on the outside of the fish pen. The actuator may include a pipe or a rod within a guide pipe. The guide pipe may be attached to the inside of the outlet channel.

The strainer regulator may include:
a wire attached to the regulator sleeve, the wire extending from the regulator sleeve to a first pulley and over this to a control mechanism; and
the control mechanism being able to displace the regulator sleeve by varying the pull on the wire.

The control mechanism may include a first winch. The strainer regulator may further include a second winch positioned on the side of the fish pen diagonally opposite the first winch, there being a centring wire extending from the second winch to a block housing the first pulley.

The control mechanism may include a buoy, and the buoy may be positioned on the inside of the fish pen. The wire may have been extended from the first pulley to and over a second pulley, up to and over a third pulley and up to the buoy; the second pulley is positioned at the side edge of the fish pen; and the third pulley is positioned submergedly at the side edge of the fish pen. The block may be attached to at least three lines extending over the fish pen and being attached to each other at the middle portion of the fish pen.

An inlet system for a closed fish pen is described as well, wherein the fish pen may be provided with an encircling buoyancy system and wherein the fish pen is provided with an outlet at its lower portion; the inlet system includes:
a pump in a pump housing;
an external supply channel which, in its upper portion, leads into the inlet of the pump and which is provided with a strainer in its inlet portion; and
a guiding channel which, at its external end, is in fluid communication with the outlet of the pump and which, at its opposite, internal end, projects into the fish pen, wherein the external supply channel, in a portion between the inlet portion and its outer portion, may include a portion which includes a length-adjustable channel, the length-adjustable channel including a channel wall in an elastic polymer material and a spiral in a rigid material housed in the channel wall, and a rope or a wire may extend from the strainer to the buoyancy system.

The strainer of the supply channel may include a strainer pipe. The rope or wire may substantially extend between the strainer and the buoyancy system on the inside of the supply channel.

An inlet system for a closed fish pen is described as well, wherein the fish pen is provided with an encircling buoyancy system, and wherein the fish pen is provided with an outlet in its lower portion; the inlet system includes:

a pump in a pump housing;

an external supply channel which, in an upper portion, leads into the inlet of the pump and which, in an inlet portion, is provided with a strainer; and a guiding channel which, at its inlet end, is in fluid communication with the outlet of the pump and which, at its opposite, internal end, projects into the fish pen, the external supply channel being composed of at least two supply channels.

The number of supply channels may be at least three. Each supply channel may be provided with a strainer in an inlet portion. Each supply channel may be connected to a strainer chamber at an inlet portion.

The inlet system may further include a damper between the outlet of the pump and the inlet end of the guiding channel. The damper may include a check valve with two flaps.

An inlet system for a closed fish pen is described as well, wherein the fish pen is provided with an encircling buoyancy system, and the fish pen is provided with an outlet in its lower portion; the inlet system includes:

a pump in a pump housing;

an external supply channel which, in an upper portion, leads into the inlet of the pump and which is provided with a strainer in an inlet portion; and a guiding channel which, at its inlet end, is in fluid communication with the outlet of the pump and which, at its opposite, internal end, projects into the fish pen, the inlet system further including a damper between the outlet of the pump and the inlet end of the guiding channel.

The damper may include a check valve with two flaps.

BRIEF DESCRIPTION OF THE DRAWINGS

In what follows, examples of preferred embodiments are described, which are visualized in the accompanying drawings, in which:

FIG. 2 shows a perspective view, on a larger scale, of a suspension means for attaching a seine or a cloth to a buoyancy system;

FIG. 3 shows a section, on a larger scale than FIG. 2, of a bulb on a seine or a cloth, the bulb being arranged to fit the suspension means shown in FIG. 2;

FIG. 4 shows a section, on the same scale as FIG. 3, of the suspension means shown in FIG. 2 and a section of a fastening member;

FIGS. 26A-26C show an alternative current-creation pipe to that shown in FIG. 23, on a different scale, 26A) showing a perspective view, 26B) showing a top view and 26C) showing a section;

FIGS. 28A-28E show a section, on a larger scale, of the current-creation pipe shown in FIG. 27 with the damper in different external positions;

FIGS. 30A-30C show the current-creation pipe with an alternative damper, on the same scale as FIG. 26;

FIG. 31 shows the current-creation pipe with an alternative damper, on the same scale as FIG. 26;

FIG. 32 shows the current-creation pipe with a further alternative damper, on the same scale as FIG. 26;

Figure 1A:
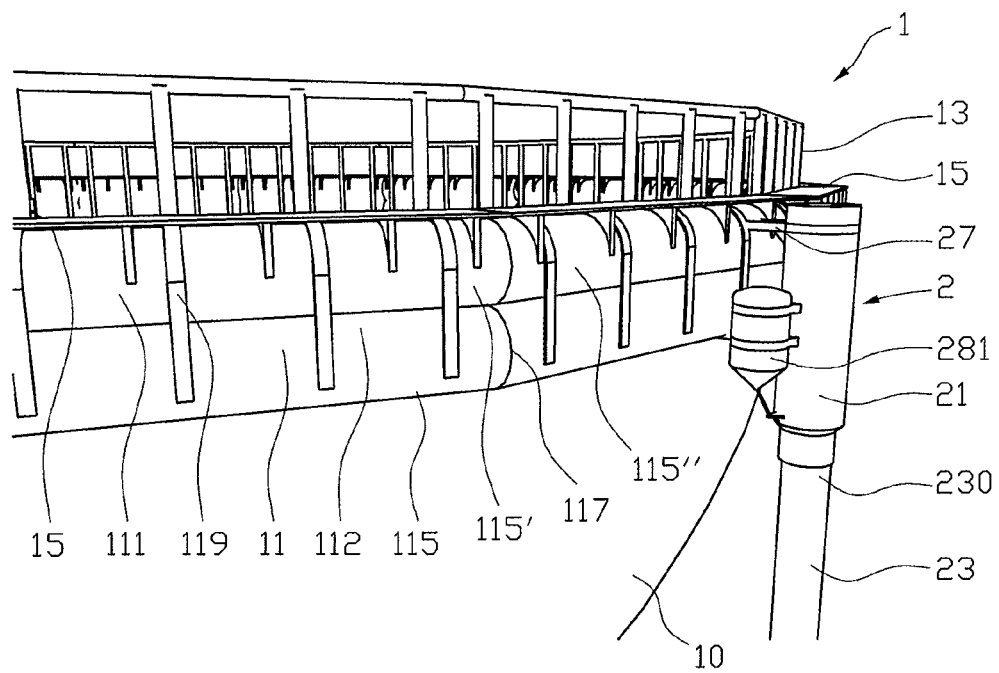
FIGS. 1A-1B show, in 1A, a portion of a closed fish pen with a buoyancy system and, in 1B on a slightly different scale, a schematic section of two rings in the buoyancy system, the rings being held together by J-shaped plates.

The figures are relatively schematic and show only details and equipment essential for the understanding of the invention. Further, the figures may be somewhat distorted when it comes to the relative dimensions of details and components shown in the figures. The figures may also have been drawn in a somewhat simplified manner when it comes to form and richness of detail of such details and components. In what follows, like, equivalent or corresponding details in the figures will by and large be indicated by the same reference numeral.

DETAILED DESCRIPTION OF THE DRAWINGS

Figure 21:
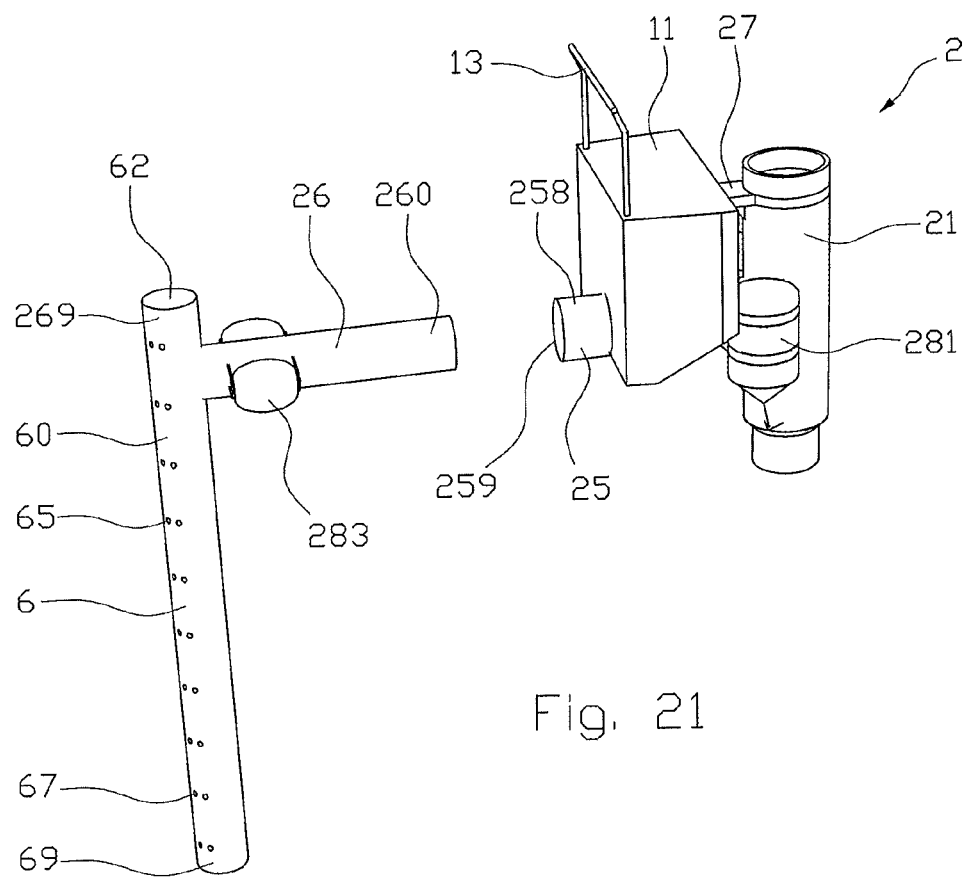
FIG. 21 shows a perspective view, on a different scale, of an inlet system for a closed fish pen.
Figure 22:
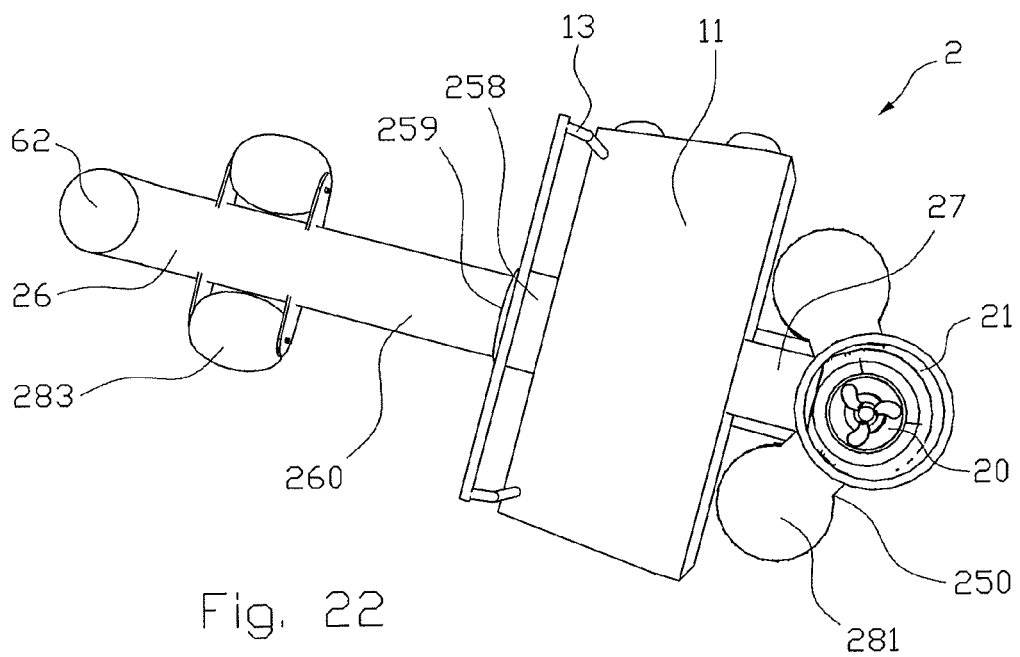
FIG. 22 shows a top view, on a different scale, of the inlet system shown in FIG. 21.
Figure 25:
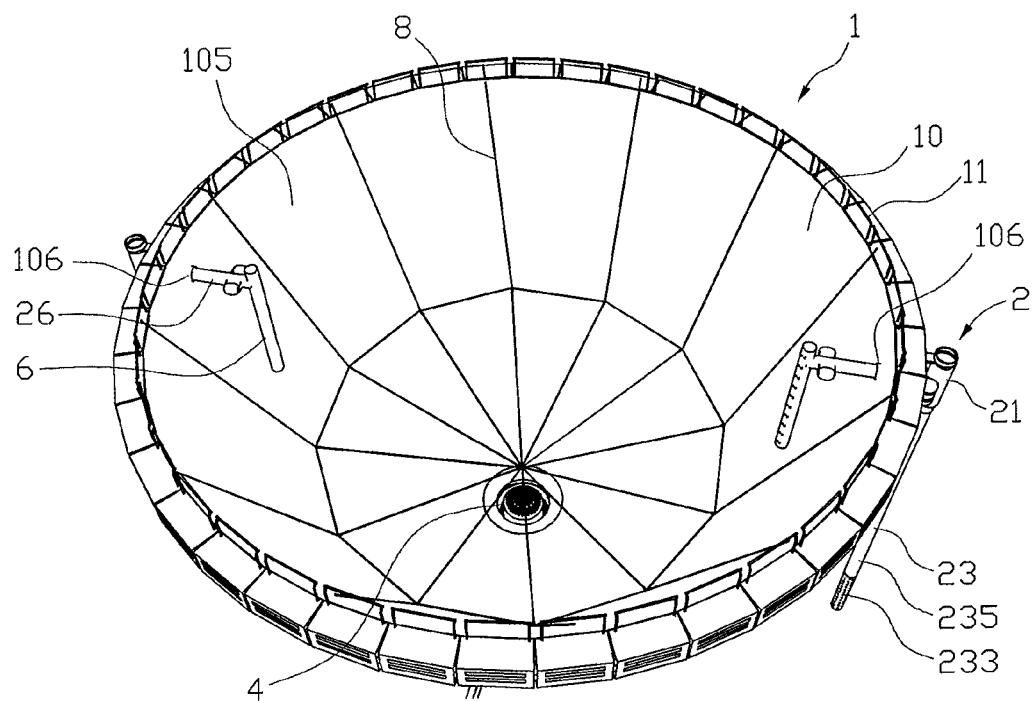
FIG. 25 shows a perspective view, on a different scale, of a closed fish pen provided with an inlet system and an outlet basin, viewed somewhat from above.

In the figures, the reference numeral 1 indicates a closed fish pen. The closed fish pen 1 includes a watertight bag 10 in a material in cloth form, a buoyancy system 11 and a railing 13. The fish pen 1 may also include a walkway 15 resting on the buoyancy system 11 as shown in FIG. 1. The fish pen 1 further includes an inlet system 2. The inlet system 2 includes a pump 20 as shown in FIG. 22 positioned within a pump housing 21, an external supply channel 23 leading into the inlet of the pump 20, and a guiding channel 25, as shown in the FIGS. 21-23, 25, which is in fluid communication at its inlet end 250 with the outlet of the pump 20, the guiding channel 25 extending past the buoyancy system 11 and through the bag 10 and projecting with its other end 259 radially from the bag 10 on the inside of the bag 10 as shown in FIG. 25. The pump housing 21 is attached to the buoyancy system 11 with at least one mounting bracket 27. The pump housing 21 may optionally be provided with at least one external buoyancy body 218 as shown in FIGS. 1, 21, 22. The inlet system 2 will be described in more detail below.

The buoyancy system 11 includes at least a first ring 111 and a second ring 112. The rings 111, 112 may have substantially the same diameter and are positioned concentrically. The first ring 111 is positioned above the second ring 112. The rings 111, 112 may consist of a polymer material such as polyethylene. The rings 111, 112 may have been made by means of extrusion and may have circular cross sections. The rings 111, 112 may be formed from pipe sections 115 that are joined together by a weld 117 so that a first pipe section 115' has a longitudinal direction that deviates from the longitudinal direction of a second pipe section 115". A polygonal ring 111, 112 is thereby formed, as shown in FIG. 1A. The ring 111, 112 may be 8-sided or 16-sided. The diameter of the first pipe section 115' may be the same as or different from the diameter of the second pipe section 115". For example, without being restrictive, the diameter of the pipe sections 115', 115" may be from 400 mm to 1000 mm. The diameter may be smaller than this and the diameter may be larger than this.

The first ring 111 and the second ring 112 are held together by a plurality of elongated, bent U-shaped plates 119 which are attached at either end portion to the wall of one of the rings 111, 112 and which extend around the neighbouring ring 111, 112. In FIG. 1A, it is shown that the plates 119 are attached to the second ring 112 and that the plates 119 extend around the first ring 111 which is positioned on top of the second ring 112. It is also possible for the plates 119 to be attached to the upper one of the rings 111, 112 and extend around the lower ring 111, 112 (not shown). The plates 119 may consist of a polymer material, such as polyethylene, or of a metal. For example, without being restrictive, the plate 119 may be 15 mm thick and 300 mm wide. The length of the plate 119 is matched to the diameter of the neighbouring ring 111, 112.

Figure 1B:
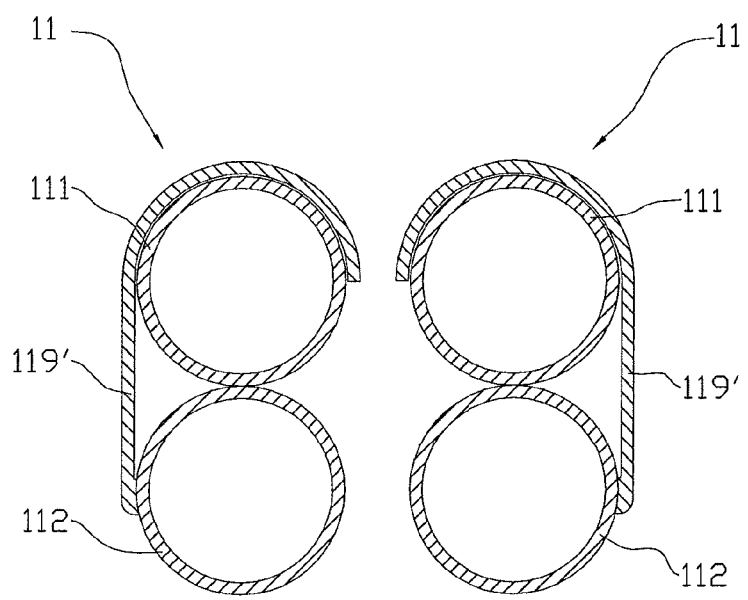

An alternative embodiment is shown in FIG. 1B. The plate 119' is shown with a J-shape. The plate 119' is attached to the second ring 112 and the plate 119' extends around a portion of the first ring 111 which is positioned on top of the second ring 112. The plates 119' may be attached to the second ring 112 so that they alternately face opposite ways as shown in FIG. 1B. In a further alternative embodiment (not shown), the plate 119' may be attached to the first ring 111, the plate 119' extending around a portion of the second ring 112 positioned below the first ring 111.

The first ring 111 and the second ring 112 are loose relative to each other and are held together by the plates 119, 119'. This has the advantage of the buoyancy system 11 keeping the flexibility of each of the rings 111, 112. The invention has the advantage of the buoyancy force of the buoyancy system coming close to the bag 10. This is in contrast to known buoyancy systems that are composed of two or more concentric rings of different diameters, one ring floating side by side outside the other ring. The buoyancy force of the outer ring contributes less than the buoyancy force of the inner ring to keeping the bag 10 afloat.

The railing 13 forms a fence as it is known within the art. The railing 13 may be composed of tubular elements in a polymer material such as polyethylene. The railing 13 is attached to the upper ring 111 in a manner known per se. The railing 13 may support a jump net (not shown) and the railing 13 may be an attachment for a bird net (not shown) as this is known within the art. Fastening devices for the bag 10 or for an ordinary seine may be welded to the upper ring 111, 112.

In an embodiment not shown, the invention may be combined with a third ring (not shown) which has a larger diameter and which floats side by side with and on the outside of the upper ring 111. The third ring may have a diameter which is smaller than the rings 111, 112. The third ring may be attached to the upper ring 111 by a plurality of clamps of a kind known per se. This has the advantage of enabling the walkway 15 to be made wider and more stable, as the walkway 15 may rest on two rings.

The person skilled in the art will understand that the buoyancy system 11 may include more than two concentric rings 111, 112 of substantially the same diameter which are positioned above each other. The person skilled in the art will also know that the buoyancy system 11 is not restricted to use on a closed fish pen 1, but may also be used for an open fish pen of a kind known per se.

FIG. 2 shows a first exemplary embodiment of a suspension means 3 for releasably attaching the bag 10 to the buoyancy system 11. At its upper edge 101, the bag 10 is formed with a longitudinal thickening 103 or bulb. The bulb 103 may be formed in a known manner by the cloth 105 of the bag 10 being folded around an elongated body 107 such as a rope or a wire and the cloth 105 being attached to itself by means of a fastening means, for example with a seam 109 or with a glue, or by means of a combination of several fastening means, so that the elongated body 107 is enclosed in the bulb 103 as shown in FIG. 3. Along one side edge, the suspension means 3 is provided with a groove 33. The groove 33 is formed with an elongated mouth portion 35 between two opposite lips 37, 37' and an elongated, substantially circular cavity 39. The diameter of the cavity 39 is larger than the distance between the two opposite lips 37, 37'. The diameter of the cavity 39 is somewhat larger than the diameter of the bulb 103 of the bag 10. The diameter of the bulb 103 is larger than the distance between the lips 37, 37'. The suspension means 3 is displaceable along the bulb 103 in the longitudinal direction of the bulb 103.

The suspension means 3 is provided with a through opening 32 which has a longitudinal axis 34 extending substantially perpendicularly to the longitudinal direction of the cavity 39. In the position of application, the through opening 32 is positioned above the cavity 39. An elongated fastening member 36 such as a rope, a hawser, a wire or a band is passed through the through opening 32 and secured to the buoyancy system 11.

The bag 10 is composed of a plurality of sectors (not shown) which are joined at their side edges by means of a fastening means, for example with a seam or with a glue, or by means of a combination of several fastening means. The sectors consist of a cloth in a polymer material and may be provided with a further reinforcement. A suitable polymer material is polyurethane. The reinforcement may consist of a woven reinforcement as it is known within the art. The bulb 103 is formed before the sectors are joined at their upper edges. The suspension means 3 is slipped onto the bulb 103 before the sectors are joined at their upper edges. The suspension means 3 is displaceable along the bulb 103 in the longitudinal direction of the bulb 103. The suspension means 3 is shorter than the bulb 103 of one sector. A plurality of suspension means 103 may be slipped onto the bulb 103 of one sector. This has the advantage of the suspension means 3 being displaceable sideways on the bulb 103 so that the fastening member 36 is positioned relative to the desired place in relation to the fastening means (not shown) of the buoyancy system 11 for the fastening member 36. It is thereby achieved that the bag 10 keeps its stretched form with no wrinkles and folds when the bag 10 is attached to the buoyancy system 11.

Figure 5:
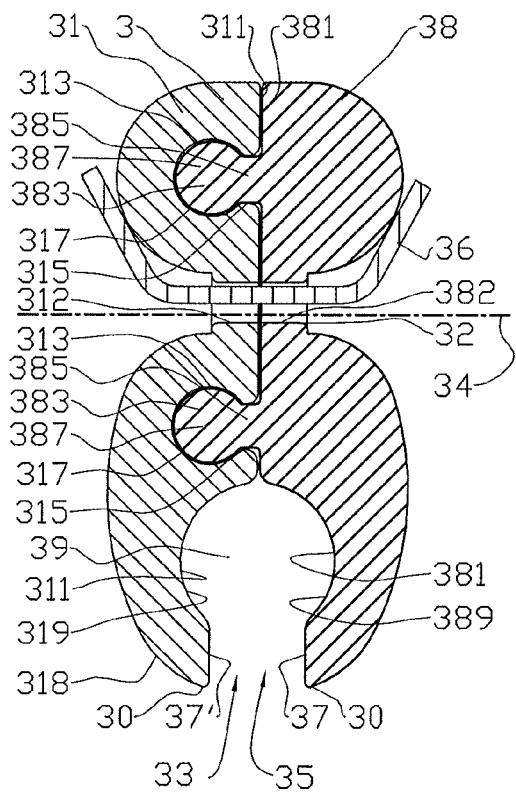
FIG. 5 shows a section, on a slightly smaller scale than FIG. 3, through an alternative suspension means.
Figure 7:
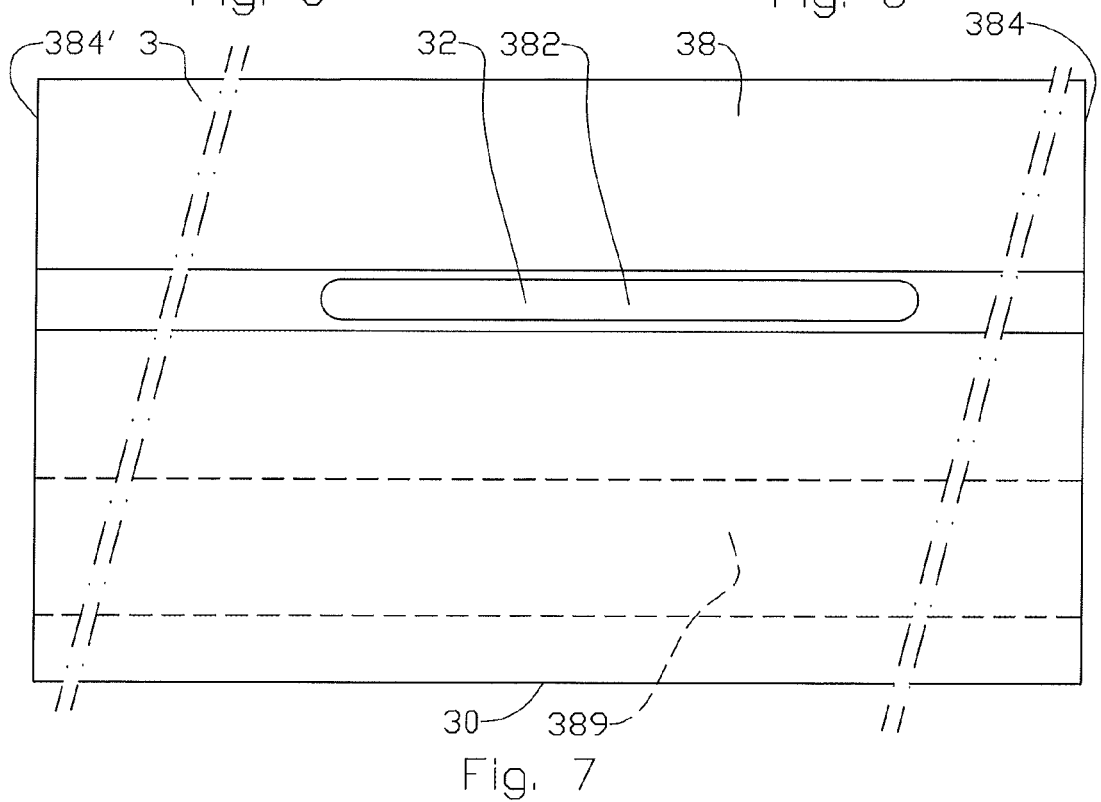
FIG. 7 shows a side view, on the same scale, of the suspension means shown in FIG. 5.

The suspension means 3 is shown in an alternative embodiment in FIGS. 5 and 7. The suspension means 3 is composed of a female part 31 and a male part 38. On its coupling side 311, the female part 31 is provided with a circular, elongated hollow profile 319. A lip 37' extends between the hollow profile 319 and an end edge 30. On its coupling side 311, the female part 31 is further provided with at least one elongated groove 313 extending substantially side by side with the elongated hollow profile 319. In the figures, two grooves 313 are shown. The groove 313 includes an outer mouth portion 315 facing out towards the coupling side 311, and an internal cavity 317. The cavity 317 has a diameter larger than the width of the mouth portion 315.

On its coupling side 381, the male part 38 is provided with at least one projecting, elongated guide 383. In the figures, the male part 38 is shown with two guides 383. The guide 383 includes a head portion 387 and a neck 385. The head portion 387 and the neck 385 complementarily fit the cavity 317 and the mouth portion 315, respectively, of the female part 31. The length of the neck 385 in the direction of projection from the coupling side 381 is matched to the depth and width of the mouth portion 315. The diameter of the head portion 387 is somewhat smaller than the diameter of the cavity 317, as shown in the figures. On its coupling side 381, the male part 38 is further provided with a circular, elongated hollow profile 389. A lip 37 extends between the hollow profile 389 and an end edge 30.

When a loose male part 38 is moved sideways relative to a loose female part 31, the guide 383 is moved into the groove 313. The coupling side 381 of the male part 38 faces the coupling side 311 of the female part 31. The hollow profile 319 and the hollow profile 389 together form an elongated cavity 39 with a mouth 35 between the lips 37, 37'. The same result is achieved by moving the female part 31 sideways relative to the male part 38. The head portion 387 of the guide 383 cannot be pulled out sideways through the mouth portion 315 of the groove 313. A separation of the female part 31 from the male part 38 by the coupling side 311 and the coupling side 38 being pulled apart in a direction perpendicular to these coupling sides 311, 318 is thereby prevented.

The female part 31 is provided with a through opening 312 from an outer side face 318 to the coupling side 311. The male part 38 is provided with a through opening 382 from an outer side face 388 to the coupling side 381. The female part 31 is displaced relative to the male part 38, or vice versa, until the through opening 312 coincides with the through opening 382. The two through openings 312, 382 form a through opening 32 in the suspension means 3. The opening 32, which has a longitudinal axis 34, extends substantially perpendicularly to the longitudinal axis of the cavity 39. In the position of application, the through opening 32 is positioned above the cavity 39. An elongated fastening member 36 such as a rope, hawser, wire or band is passed through the through openings 312 and 382. The fastening member 36 locks the female part 31 and the male part 38 so that, practically, they cannot be displaced sideways relative to each other. The fastening member 36 is secured to the buoyancy system 11.

The female part 31 and the male part 38 may, for example, consist of a metal, such as aluminium, and are formed as rods by being extruded in a manner known per se. In another embodiment, the female part 31 and the male part 38 may consist of a hard polymer material. When necessary, a piece of a suitable length is cut from the string. The openings 312 and 382 are then formed in the desired positions in the female part 13 and the male part 38, respectively, by means of drilling or milling, for example.

A two-part suspension means 3 which includes a female part 31 and a male part 38 has the advantage of enabling the suspension means 3 to be fitted to a bulb 103 on a bag 10 after the bag 10 has been fully assembled, for example to reinforce the attachment of the bag 10 to a buoyancy system 11 while the bag 10 is filled with water. The suspension means 3 can also be removed from the bag 10 whenever required.

Figure 6:
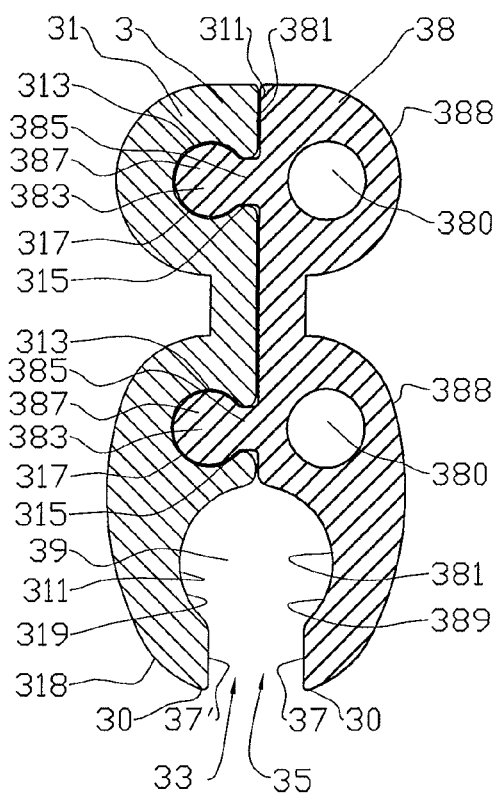
FIG. 6 shows the same as FIG. 5, but in a further alternative embodiment.
Figure 8:
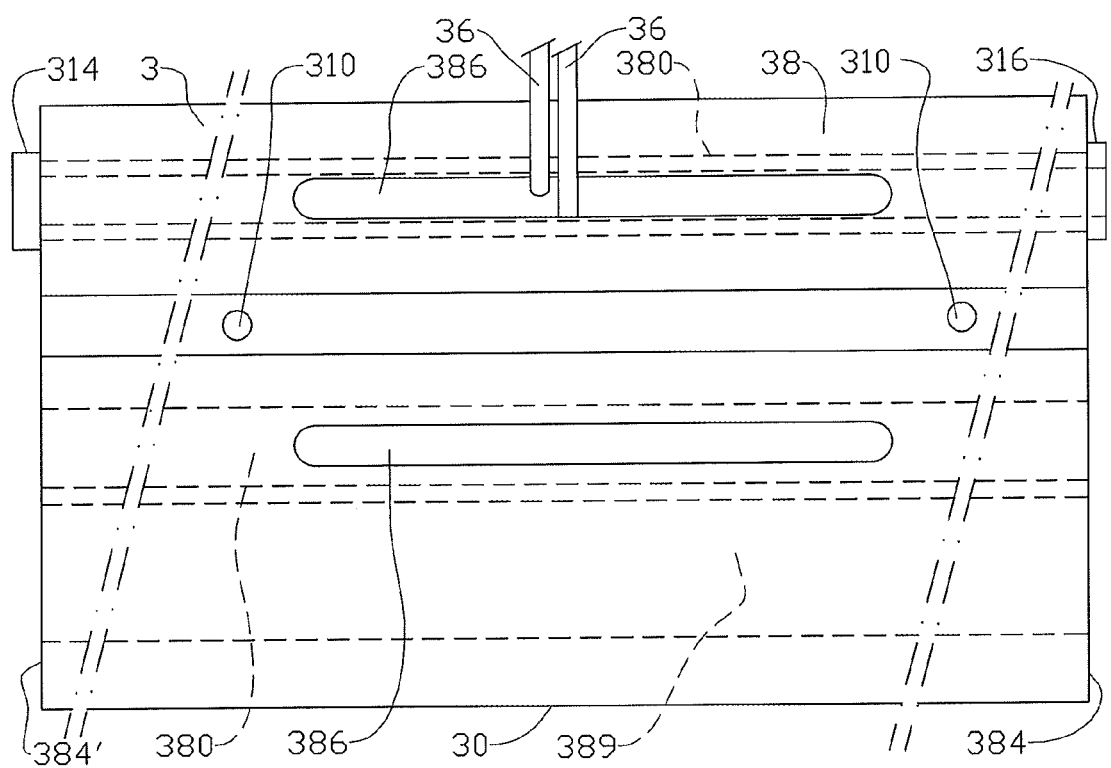
FIG. 8 shows a side view, on the same scale, of the suspension means shown in FIG. 6.

An alternative embodiment of a two-part suspension means 3 is shown in FIGS. 6 and 8. In this embodiment, the female part 31 is formed as in the preceding embodiment shown in FIGS. 5 and 7, but without the through opening 312. The male part 38 is also formed with at least one guide 383 and a hollow profile 389, and these are not described any further. The male part 38 is formed without the through opening 382. The male part 38 is provided with at least one through bore 380 extending substantially side by side with the hollow profile 389 from one end face 384 of the male part 38 to the opposite end face 384'. An opening 386 is formed between one outer side 388 of the male part 38 and the bore 380 as shown in FIG. 8. A threaded bolt 314 may be passed through the bore 380 from one of the end faces 384, 384' and secured with a nut 316 at the opposite end face 384, 384'. A fastening member 36 may be passed into the opening 386 and around the bolt 314 and out of the opening 386 again. The fastening member 36 may be secured to the buoyancy system 11. In this embodiment, the female part 31 and the male part 38 must be anchored to each other with one or more through screws or set screws 310 oriented perpendicularly to the coupling side 381, in order to prevent the female part 31 and the male part 38 from being displaced sideways relative to each other.

Figure 9:
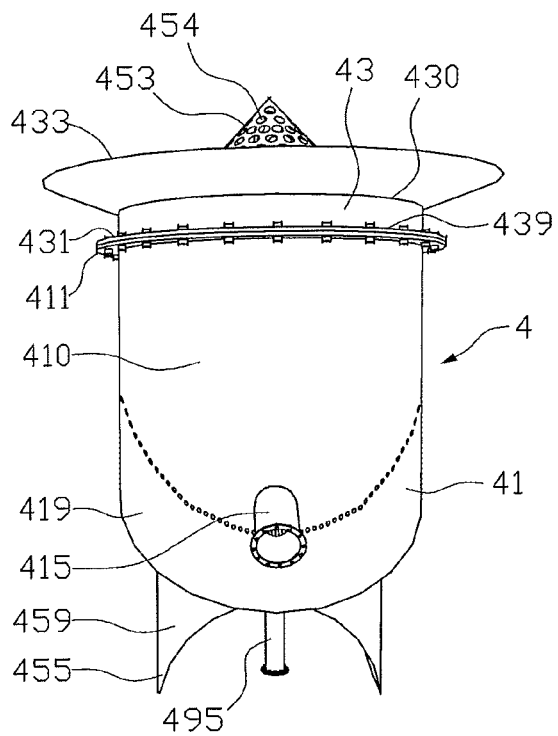
FIG. 9 shows a side view, on a different scale, of an outlet basin for a fish pen.
Figure 10:
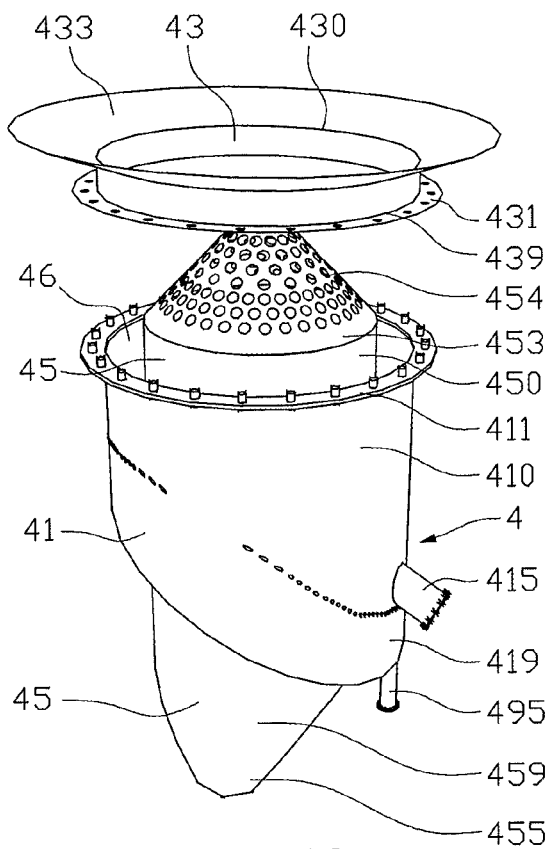
FIG. 10 shows a perspective view, in an exploded drawing on a different scale, of the outlet basin shown in FIG. 9.
Figure 11:
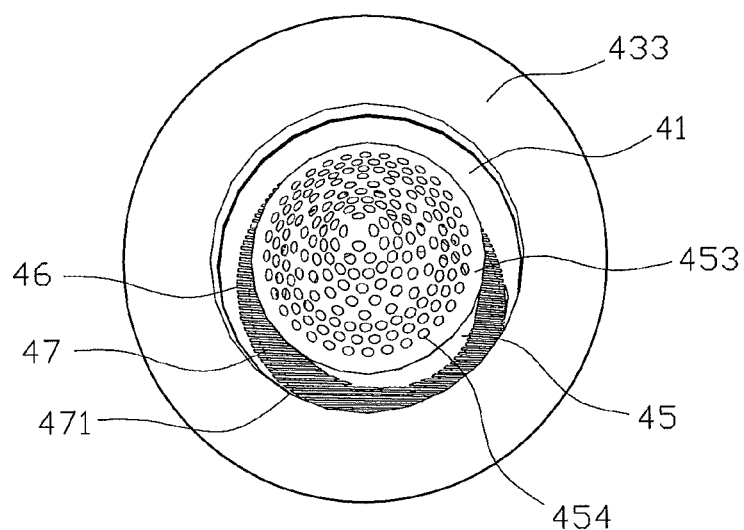
FIG. 11 shows a top view, on a different scale, of the outlet basin shown in FIG. 9.
Figure 14:
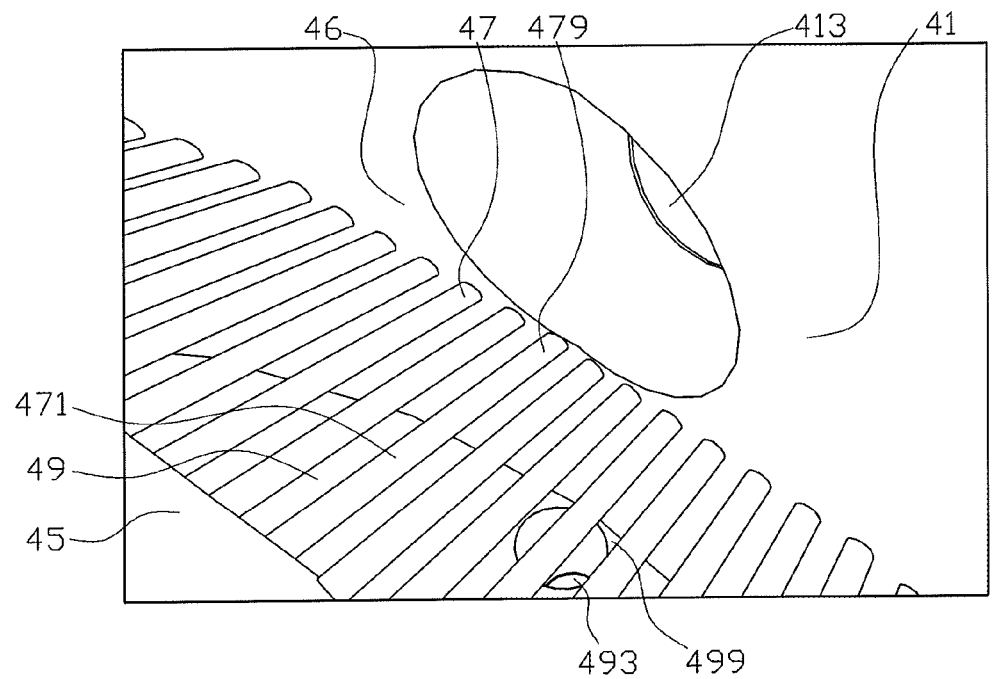
FIG. 14 shows a perspective view, on a different scale, of a detail at an opening inside an outlet basin.

FIG. 9 shows an outlet basin 4 for a fish pen 1. The outlet basin 4 may be used on an open fish pen 1 of a kind known per se, on a closed fish pen 1 with rigid walls and on a closed fish pen 1 with walls in a soft material in cloth form. The outlet basin 4 is positioned in an opening in the lower portion 179 of the fish pen 1. The outlet basin 4 includes a housing 41. In the drawings, the housing 4 is shown as a circular cylinder, but the housing 41 may also have other cross sections, such as a polygonal cross section. In an upper portion 410, the housing 41 is provided with a flange 411 for the attachment of a mounting collar 43. In a lower portion 439, the mounting collar 43 is provided with a flange 431 for attachment to the flange 411 of the housing 41. The flanges 411, 431 may be secured to each other with a plurality of bolts as it is known within the art. The housing 41 is provided with a through opening 413 in a lower portion 419, as shown in FIG. 14, and the opening 413 leads into a first pipe socket 415 projecting radially from the external jacket of the housing 41.

In an upper portion 430, the mounting collar 43 is provided with an attachment ring 433. The attachment ring 433 protrudes radially, in an encircling manner, from the mounting collar 43. The attachment ring 433 is arranged to be attached to an open fish pen 1, a closed fish pen 1 with rigid walls or to a closed fish pen 1 with walls of a soft material in cloth form. A person skilled in the art will know how this can be done, and this is not described any further.

Figure 12:
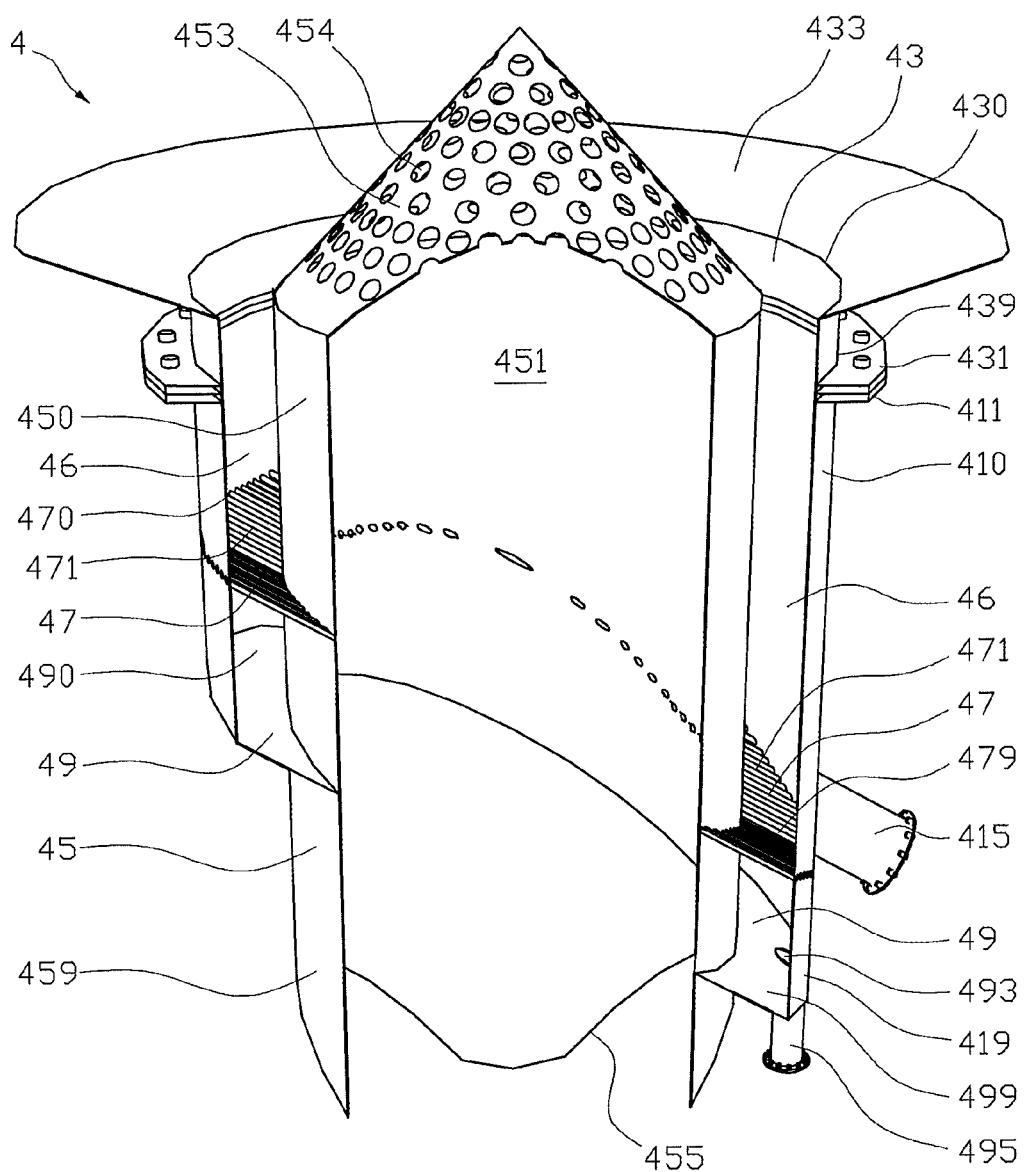
FIG. 12 shows a partial section, on a different scale, of the outlet basin shown in FIG. 9.

The housing 41 houses a through-going outlet channel 45. At its upper portion 450, the outlet channel 45 is provided with an inlet portion 451 as shown in FIG. 12. To the inlet portion 451, a strainer 453 is attached, covering the cross section of the outlet channel 45. The strainer 453 is shown as a cone with its apex projecting upwards. The strainer 453 is provided with a plurality of through bores 454. The outlet channel 45 is open at its lower portion 459. The lower portion 459 projects below the lower portion 419 of the housing. The lower portion 459 is formed with recesses 455. The outlet channel 45 is shown as a circular cylinder, but the outlet channel 45 may also have other cross sections, such as a polygonal cross section. The housing 41 and the outlet channel 45 form an annular space 46 between themselves.

A slanted grating 47 is positioned in the in the annular space 46. The grating 47 is attached to the inner jacket of the housing 41 and to the outer jacket of the outlet channel 45. The grating 47 holds the outlet channel 45 fixed to the housing 41. The grating 47 shown includes ribs 471 which are oriented side by side, wherein water and sludge may pass between the ribs 471. In an alternative embodiment, the grating 471 may include a sieve plate 47 in which the number of holes and the diameter of the holes have been matched to the purpose (not shown). The lowermost portion 479 of the grating 47 is attached to the inner jacket of the housing 41 just below the through opening 413 as shown in FIG. 14. The uppermost portion 470 of the grating 47 is positioned on the diametrically opposite side in the annular space 46. The grating 47 covers the entire annular space 46.

A slanted bottom plate 49 is positioned in the annular space 46 below the grating 47 and seals the annular space 46 against the housing 41 and the outlet channel 45. The bottom plate 49 holds the outlet channel 45 fixed to the housing 41. The bottom plate 49 may consist of a solid plate or consist of a fine-meshed material. The bottom plate 49 may be oriented substantially side by side with the grating 47 as it is shown in the figures. This is not critical to the invention as the bottom plate 49 may slope in a different direction from that of the grating 47. A through opening 493 is formed in the lowermost portion 499 of the bottom plate 49 at the internal jacket surface of the housing 41, as shown in FIGS. 12 and 14. The opening 493 leads into a second pipe socket 495 on the bottom side of the bottom plate 49. In an alternative embodiment (not shown), the opening 493 may be positioned in the housing 41 and the lowermost portion 499 of the bottom plate 49 is attached to the inner jacket of the housing 41 just below the through opening 493. The opening 493 leads into the second pipe socket 495 which, in this alternative exemplary embodiment, projects radially from the external jacket of the housing 41.

Figure 13:
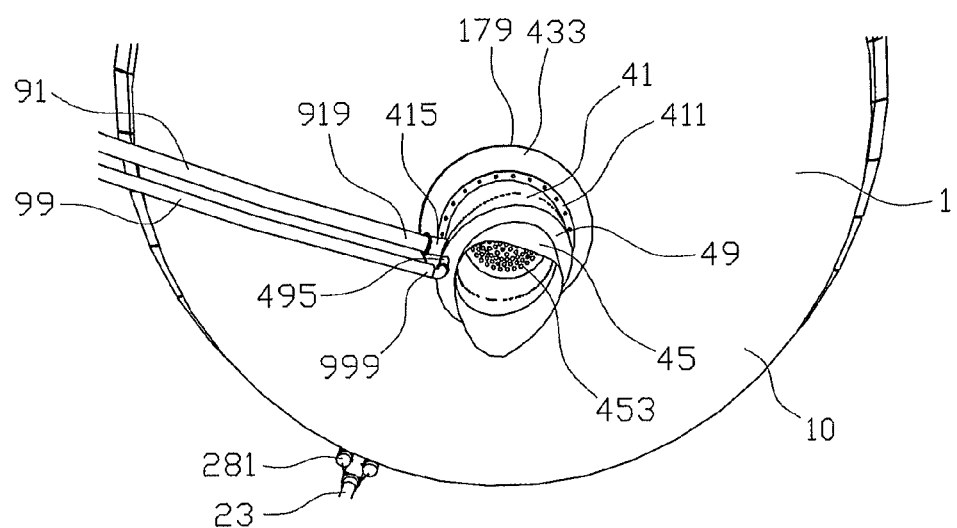
FIG. 13 shows a perspective view, on a different scale, of a closed fish pen with an outlet basin, viewed from below.

A first outlet hose 91 is sealingly attached at a lower end 919 to the first pipe socket 415 as shown in FIG. 13. At its upper end (not shown), the outlet hose 91 is extended up to a first suction pump (not shown) on the surface. The first suction pump is arranged to suck water through the outlet hose 91. A second outlet hose 99 is sealingly attached at a lower end 999 to the second pipe socket 495. At its upper end (not shown), the outlet hose 99 is extended up to a second suction pump (not shown) on the surface. The second suction pump is arranged to suck water through the outlet hose 99. The first suction pump and the second suction pump may consist of the same pump. The person skilled in the art will know that the first suction pump may be replaced with a so-called mammoth pump which works by blowing air into the lower portion of the outlet hose 91 so that a gas lift is created in the outlet hose 91. Correspondingly, the second suction pump may also be replaced with a mammoth pump.

Because an overpressure is formed within a closed fish pen 1 when water is pumped into the fish pen 1, the water will flow out through accessible openings. The outlet basin 4 is positioned in such an opening in the lower portion 179 of the fish pen. The outlet channel 45 is formed in such a way that water may flow freely out of the fish pen 1 through the outlet channel 45. The strainer 453 prevents fish in the fish pen 1 from swimming out through the outlet channel 45. The strainer 453 is provided with a large number of bores 454 to allow a large water flow through the outlet channel 45.

Dead fish (not shown) sink down towards the lower portion 179 of the fish pen 1 and further towards the slanted bottom 172 of the fish pen. The water flow will carry the dead fish towards the outlet basin 4. The fish will be rejected by the cone-shaped strainer 453 and sink into the annular space 46. Fish sinking straight down in the fish pen 1 may hit the strainer 453 and be guided into the annular space 46. In the annular space 46, the fish will come to rest on the slanted grating 47. The fish will possibly also slide by its own weight on the grating 47 towards the opening 413 in the housing 41. Whenever required, the first pump is started on the surface. Water is sucked up through the outlet hose 91. Water is thereby drawn down the annular space 46 and exits through the opening 413. Fish lying on the grating 47 will be carried by the water flow out through the opening 413, through the first outlet hose 91 and to the pump where the fish are separated from the water flow in a straining vessel and are taken care of in a known manner of treating dead fish.

Sludge, faecal matter and other particles sinking down towards the slanted bottom 172 of the fish pen 1 will sink further downwards towards the lower portion 179 of the fish pen and into the annular space 46. When necessary, the second pump is started on the surface. Water is sucked up through the outlet hose 99. Water is thereby drawn down into the annular space 46, flowing past the ribs 471 in the grating 47 or the holes in the sieve plate 47 and out through the opening 493. Sludge and light particles are carried in the water flow out through the opening 493, through the second outlet hose 99 to the pump where the sludge, faecal matter and particles are separated from the water flow and are dealt with in a known way of treating such material.

Over time, particles will settle on the strainer 453 and the strainer 453 may become fouled with marine organisms (not shown). The bores 454 will thereby have a less effective opening for water passage. Reduced water flow leads to the height difference of a water surface 17' within the fish pen 1 increasing relative to a water surface 17 outside the fish pen 1. This leads to increased load on the bag 10 and the buoyancy system 11 of the fish pen 1. The strainer 453 may be provided with a brush system (not shown) for cleaning the strainer 453. Such a brush system may be manually operated, or it may be provided with a motor or an actuator for operation.

Figure 34:
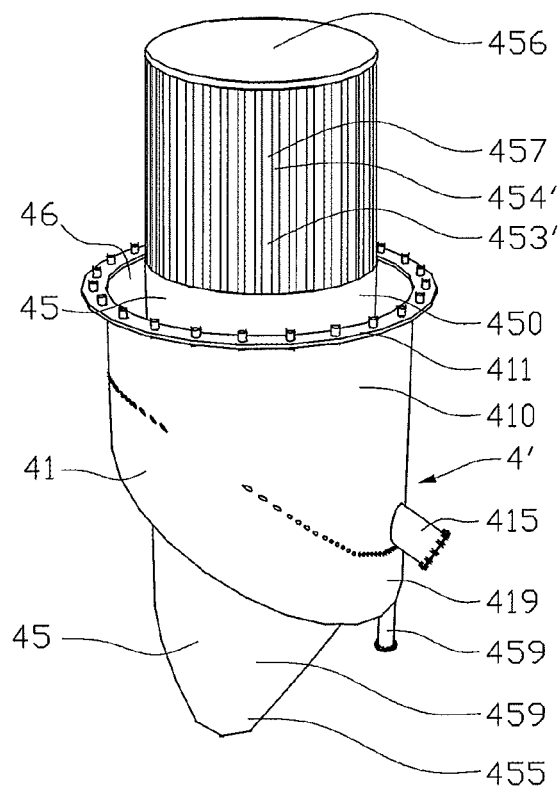
FIG. 34 shows a perspective view, on the same scale as FIG. 10, of an alternative embodiment of the outlet basin.

An alternative embodiment of an outlet basin 4' is shown in FIG. 34. To the inlet portion 451, a strainer 453' is attached, covering the cross section of the outlet channel 45. The strainer 453' includes a relatively flat top plate 456. Between the outer edge of the top plate 456 and the edge of the outlet channel 45, a plurality of ribs 457 extend side by side. Between the ribs 457, elongated openings 454' have been formed, forming straining slots 454'. This design has the advantage of the effective straining area not being restricted by the cross section of the outlet channel 45, but by the height of the strainer 453'. The height can be made very big. Another advantage is that the straining slots 454' do not so easily become clogged with particles, and the need for cleaning the strainer 453' is reduced. The ribs 457 may consist of pipes.

Figure 35:
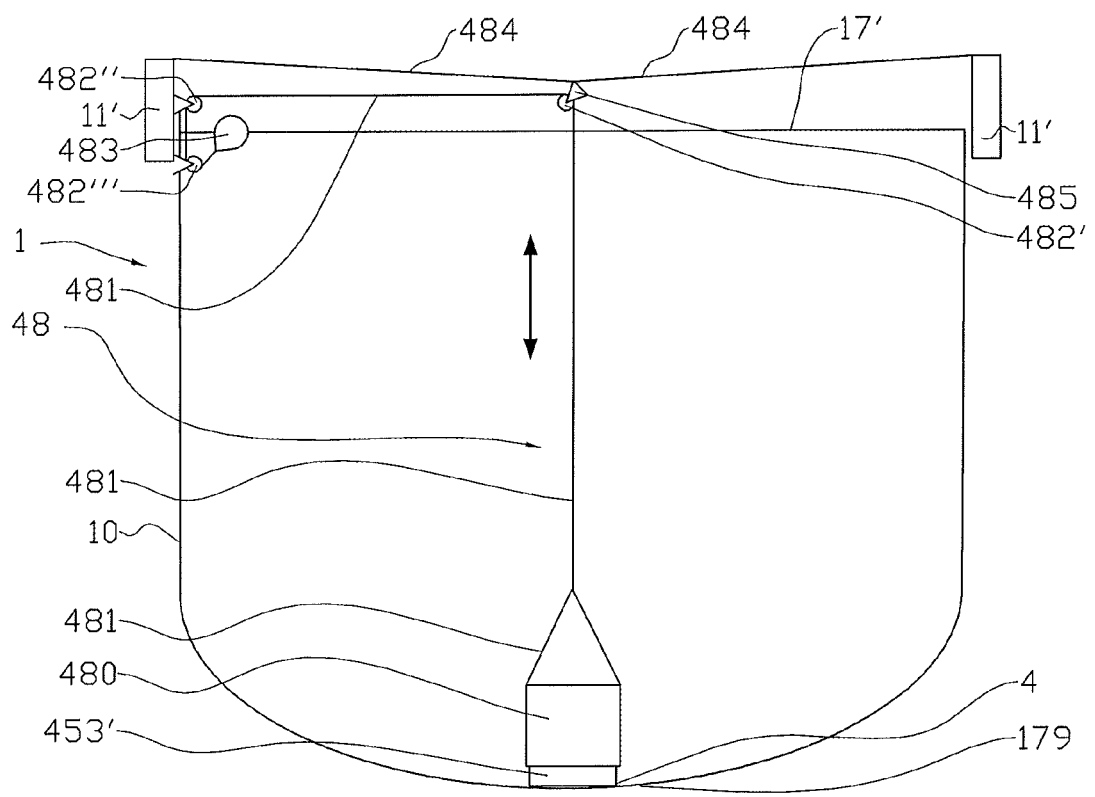
FIG. 35 shows a principle drawing, on a different scale, of the regulation of a water flow out of an outlet basin.

In FIG. 35, a self-adjusting strainer regulator 48 is shown. The strainer regulator 48 includes a regulator sleeve 480 which is positioned on the outside of the strainer 453' shown in FIG. 34 and a control mechanism. The regulator sleeve 480 is displaceable relative to the strainer 453'. The strainer regulator 48 may include an open regulator sleeve 480, or the regulator sleeve 480 may be provided with a lid or a sealing plate (not shown) at the top. The regulator sleeve 480 is attached to a wire or a rope 481. In FIG. 35, it is shown that the wire 481 is attached to the upper portion of the regulator sleeve 480. The wire 481 has been extended up to and over a first pulley 482' in the middle portion of the fish pen 1 so that the wire 481 has a substantially vertical orientation. From the first pulley 482', the wire 481 has been extended to and over a second pulley 482". The second pulley 482" is positioned at the side edge of the fish pen 1. From the second pulley 482", the wire 481 has been extended down to and over a third pulley 482'". The third pulley 482'" is positioned submerged at the side edge of the fish pen 1. From the third pulley 482'", the wire 481 has been extended to a buoy 483 on the water surface 17' within the fish pen 1. The first pulley 482' is housed in a block 485 attached to a plurality of lines 484 which are secured to separate buoyancy bodies 11' and which extend to the middle portion of the fish pen 1. The fish pen 1 may be provided with three lines 484 or more than three lines 484, for example six lines 484, which are attached to each other at the middle portion of the fish pen 1. The lines 484 may, for example, meet at a distance of 0.5 metre to 1.0 metre above the water surface 17'. The third pulley 482'" may, for example, be positioned at a depth of 0.5 metre to 1.0 below the water surface 17'.

If the water level within the fish pen 1 increases because of reduced straining area in the strainer 453', the buoy 483 will rise slightly. The outlet basin 4 in the lower portion 179 of the fish pen 1 will sink downwards because the increased weight of the water within the fish pen 1 lowers the buoyancy system 11 and thereby the bag 10 attached to the buoyancy system 11. As the buoy 483 rises slightly in the opposite direction to that of the outlet basin 4 which is sinking down, and the lines 484 are secured to their separate floating bodies 11', the buoy 483 will pull on the wire 481 and move the regulator sleeve 480 upwards relative to the strainer 453'. The straining area of the strainer 453' thereby increases and the water flow through the outlet basin 4 increases. With that, the amount of water inside the fish pen 1 decreases and the buoy 483 will pull less on the regulator sleeve 480 which is displaced downwards relative to the strainer 453'. The strainer regulator 48 will thereby be self-adjusting.

Figure 36:
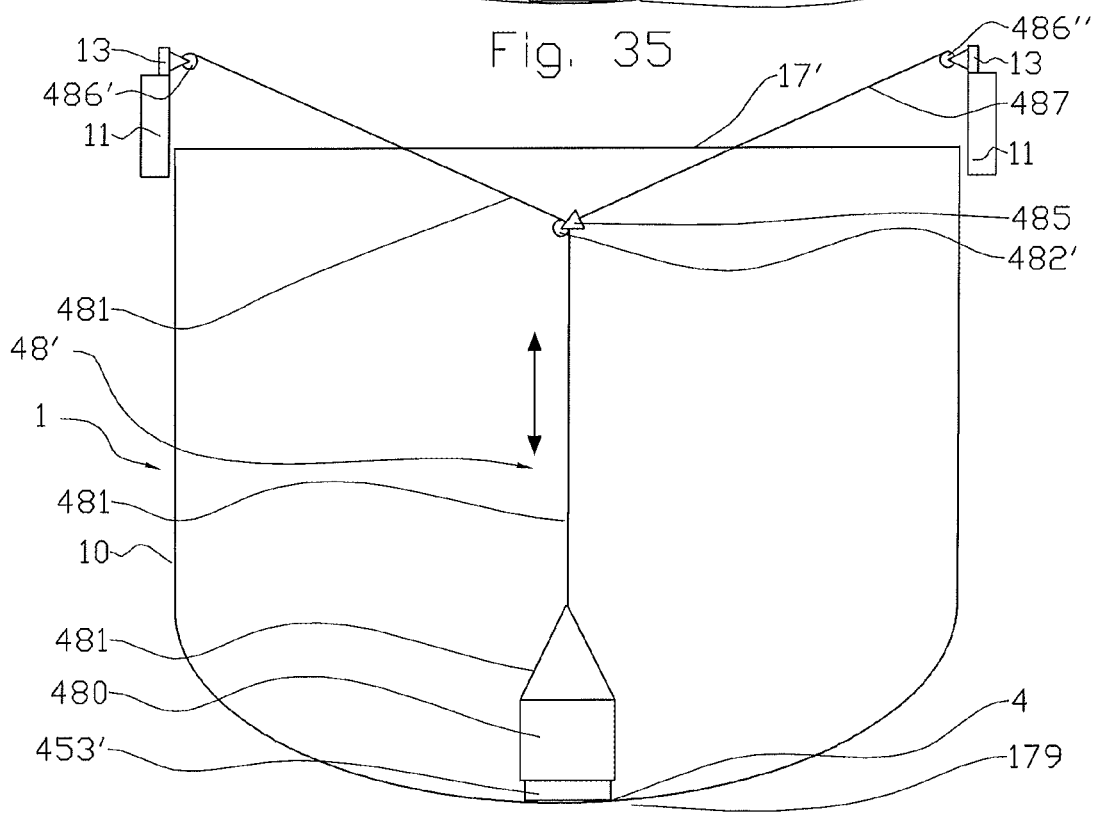
FIG. 36 shows an alternative embodiment for regulating the water flow out of the outlet basin, on the same scale as FIG. 35.

An alternative strainer regulator 48' is shown in FIG. 36. The strainer regulator 48' includes a regulator sleeve 480 which is positioned on the outside of the strainer 453' shown in FIG. 34. The strainer regulator 48' may include an open regulator sleeve 480, or the regulator sleeve 480 may be provided with a lid or a sealing plate (not shown) at the top. The regulator sleeve 480 is attached to a wire or a rope 481 at its upper portion. The wire 481 has been extended up to and over a first pulley 482' in the middle portion of the fish pen 1 so that the wire 481 has a substantially vertical orientation. From the first pulley 482', the wire 481 has been extended to a first winch 486'. The first winch 486' may be attached to the railing 13 of the fish pen. A second winch 486" is attached on the diagonally opposite side of the fish pen 1, for example to the railing 13 of the fish pen 1. A centring wire 487 is attached at one end to the block 485 and at its opposite end to the second winch 486".

The second winch 486" adjusts the free length of the centring wire 487 so that the block 485 is positioned above the outlet basin 4 in the middle portion of the fish pen 1. The first winch 486' controls the free length of the wire 481 and thereby the position that the regulator sleeve 480 has relative to the strainer 453'. The water flow out through the outlet basin 4 is actively adjusted by means of the first winch 486'. Increased flow is achieved by shortening the free length of the wire 481 so that the regulator sleeve 480 is moved upwards along the strainer 453' and the effective straining area is increased. A reduced water flow is achieved by lengthening the free length of the wire 481 so that the regulator sleeve 480 is moved downwards along the strainer 453' and the effective straining area is reduced.

Figure 37A:
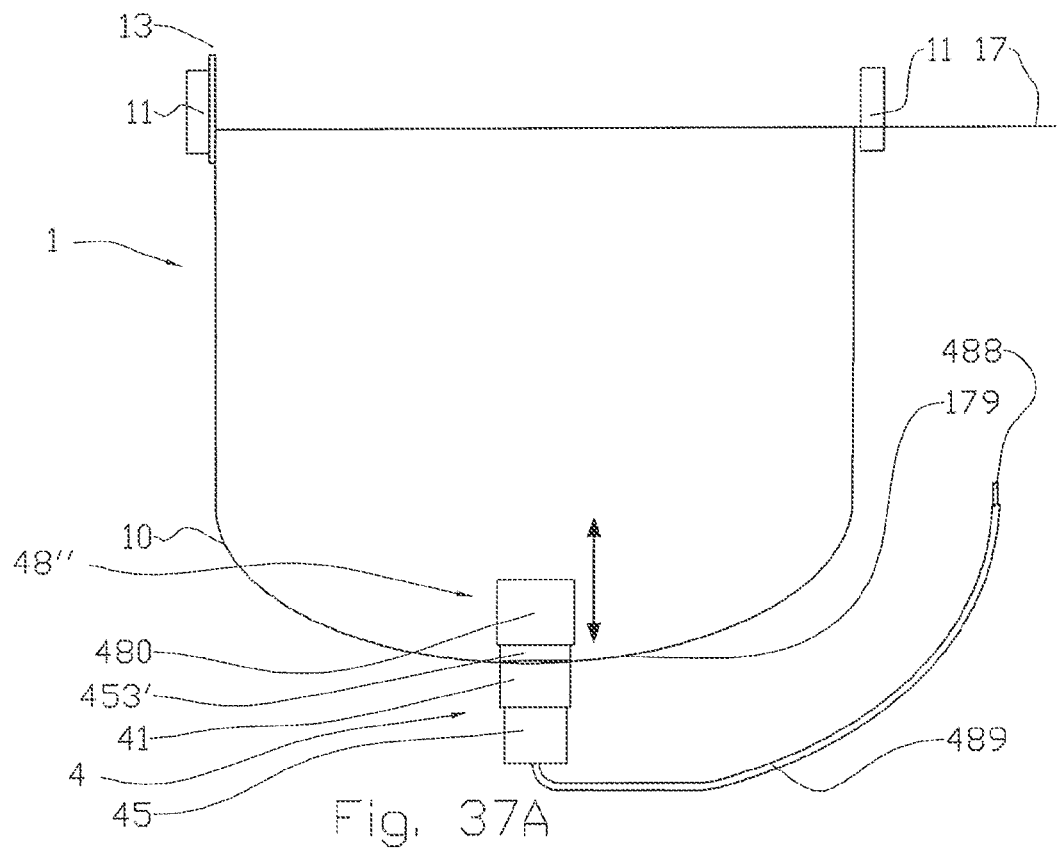
FIGS. 37A-37B show, in 37A), a principle drawing, on a different scale, of a further alternative embodiment for the regulation of a water flow out of an outlet basin, and, in 37B), a detail on a larger scale.
Figure 37B:
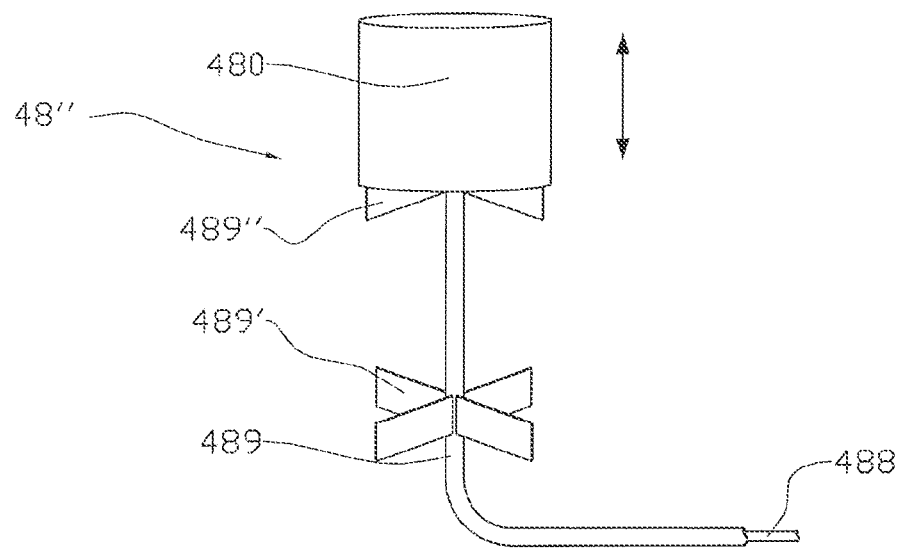

In the event of a loss of electrical power, either the first winch 486' or both the first winch 486' and the second winch 486" is/are arranged to pay out wire 481, 487. The regulator sleeve 480 will thereby be displaced all the way down along the strainer 453' and the water flow through the outlet basin 4 will practically stop. This has the advantage of a loss of electrical power that results in the pumps 20 stopping the supply of water to the fish pen 1 not resulting in water flowing out from the fish pen 1, and the fish pen 1 keeps its shape. An alternative strainer regulator 48" is shown in FIG. 37. The strainer regulator 48" includes a regulator sleeve 480 which is positioned on the outside of the strainer 453' as shown in FIG. 34. In this alternative embodiment, the regulator sleeve 480 is displaced relative to the strainer 453' by a control mechanism including an actuator 488. The strainer regulator 48" may include an open regulator sleeve 480, or the regulator sleeve 480 may be provided with a lid or a sealing plate (not shown) at the top. The actuator 488 may be a flexible pipe or a flexible, solid rod. The actuator 488 is moved inside a guide pipe 489. The actuator 488 and the guide pipe 489 may form a pipe-in-pipe connection. The actuator 488 is attached to the regulator sleeve 480. The actuator 488 and the guide pipe 489 extend from the outlet channel 45 of the outlet basin 4, to the water surface 17 outside the fish pen 1 and above the water surface 17. The actuator 488 extends through the outlet channel 45, the strainer 453' and projects above the strainer 453' in an opening in the top plate 456 of the strainer 453' (not shown). The guide pipe 489 is shown attached to a lower attachment 489' and an upper attachment 489". The attachments 489', 489" are fixed to the inside of the outlet channel 45. The actuator 488 projects out of the guide pipe 489 above the upper attachment 489".

The actuator 488 may be operated manually, for example from the buoyancy system 11 of the fish pen 1. The actuator may also be operated by a motor, for example an electric motor (not shown), arranged to displace the actuator 488 relative to the guide pipe 489. The motor operation may be arranged in such a way that when there is a loss of electrical power, the regulator sleeve 480 will sink down on the strainer 453' by its own weight.

The regulator sleeve 480 in the embodiments described may be provided with buoyancy means (not shown) so that the regulator sleeve 480 has little negative buoyancy, for example a buoyancy of −10 kg or −20 kg.

FIGS. 15-19 show a closed fish pen 1, in which the upper portion 170 of the fish pen is formed with a spherical shape and the lower portion 179 of the fish pen 1 is formed with a conical shape. In the figures, the depth of the fish pen 1 is shown by the arrow D. The depth D of the fish pen 1 extends from the water surface 17 to the outlet of the fish pen 1 in the conical, lower portion 179. The depth ($D_S$) of the spherical, upper portion 170 extends from the water surface 17 to the transition between the spherical, upper portion 170 and the conical, lower portion 179. The depth ($D_C$) of the conical, lower portion 179 extends from the transition between the spherical, upper portion 170 and the conical, lower portion 179 to the outlet of the basin in the conical, lower portion 179. This has the advantage of the fish pen 1 combining the properties of a spherical fish pen with the properties of a tapered seine. By that, the fish pen 1 will get good sea properties combined with a large volume. The fish pen 1 also has the advantage of the slanted bottom 172 of the fish pen 1 having a greater slope than the bottom of a spherical fish pen of the same diameter. Sludge and sediments will thereby be carried more easily towards the outlet of the fish pen 1.

Figure 15:
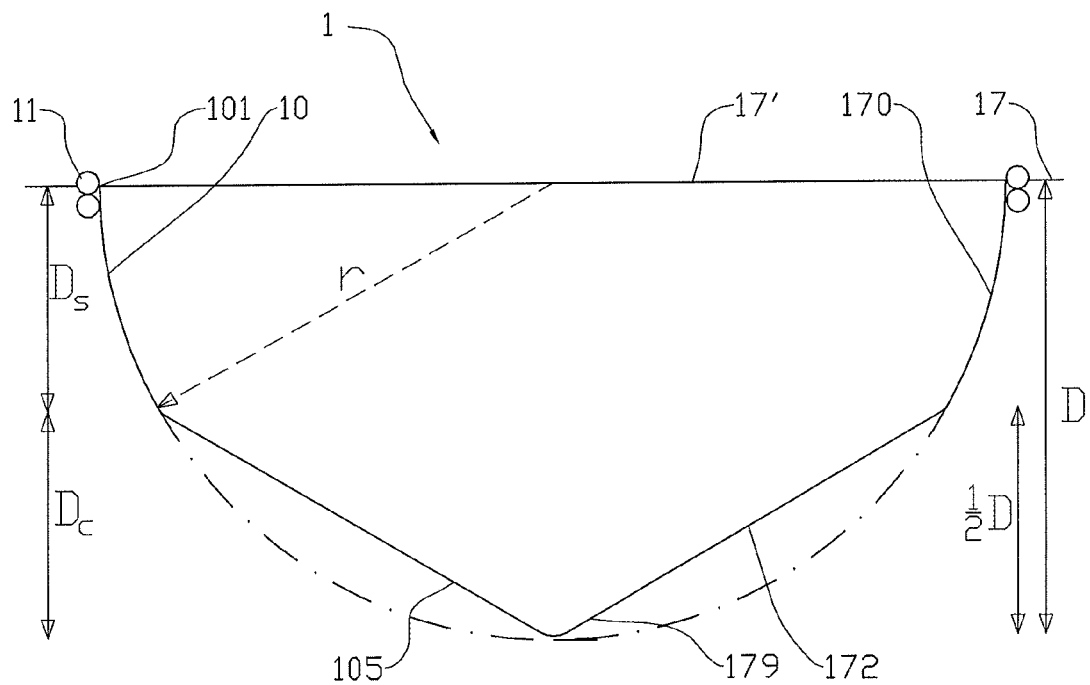
FIG. 15 shows a side view, on a different scale, of the geometry of a closed fish pen.
Figure 16:
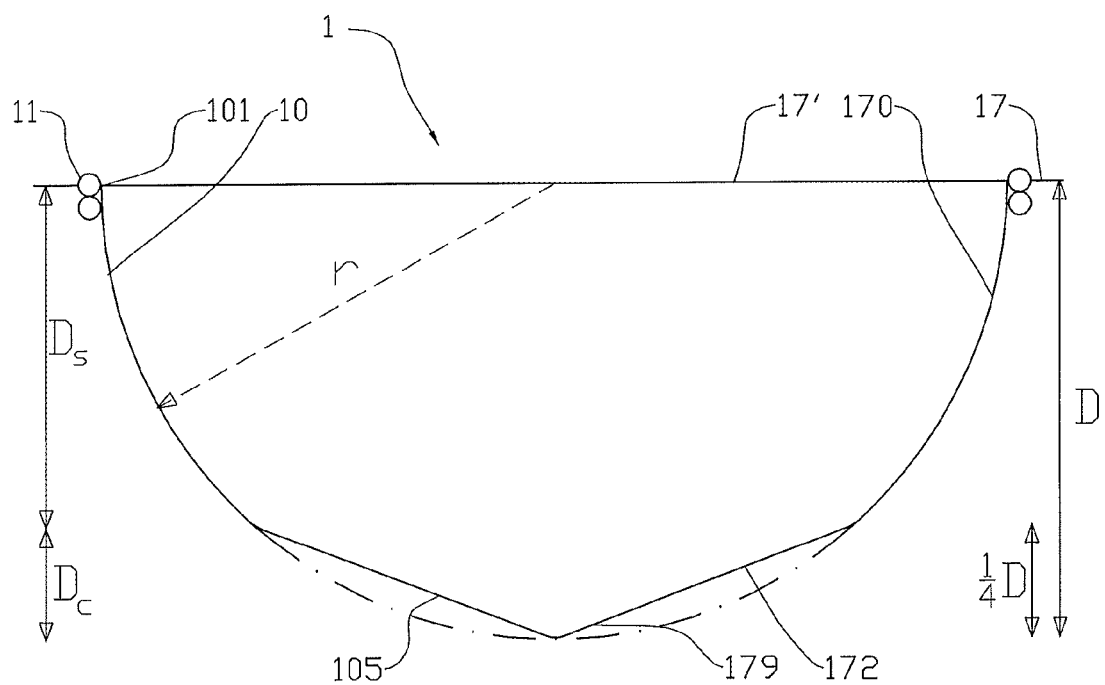
FIG. 16 shows the same as FIG. 15 in another embodiment.
Figure 17:
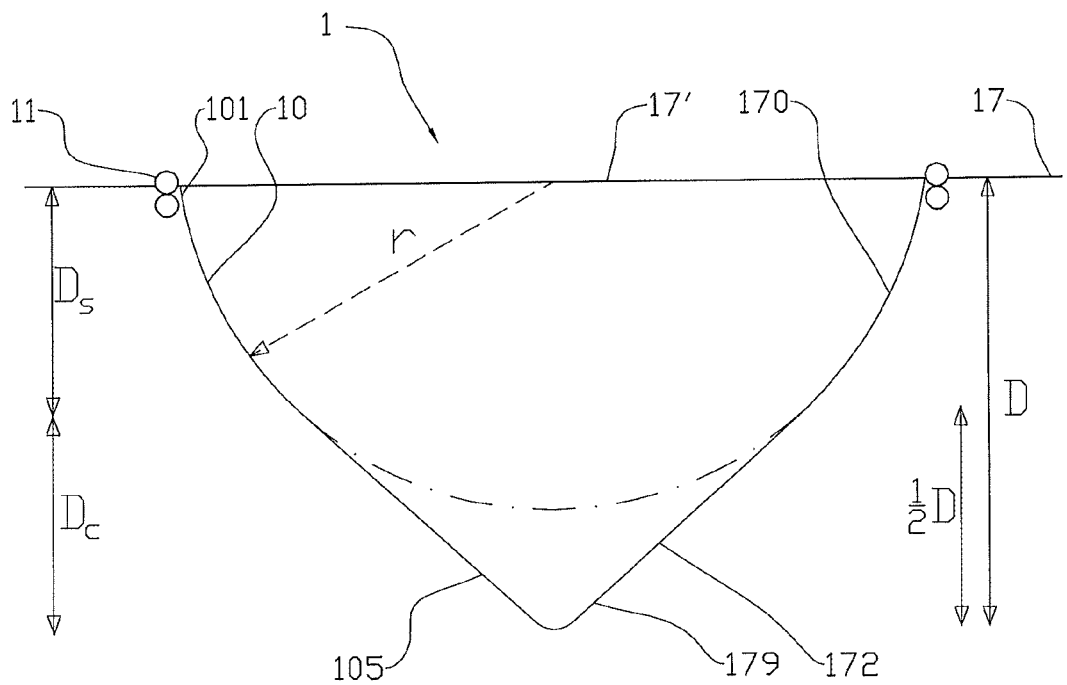
FIG. 17 shows the same as FIG. 15 in another embodiment.
Figure 18:
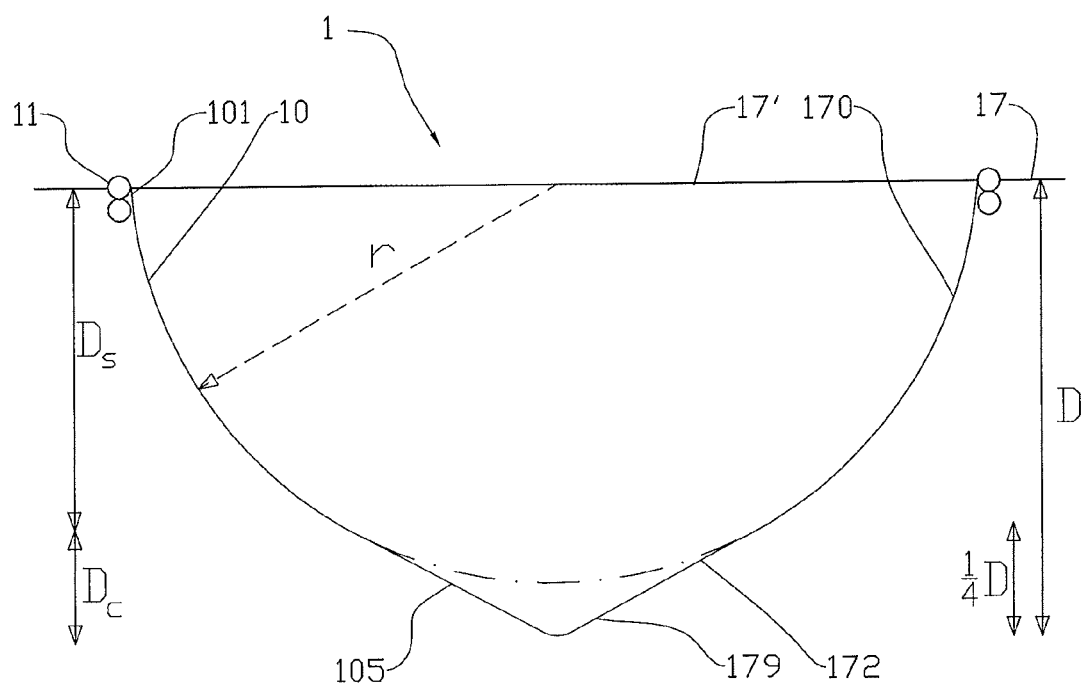
FIG. 18 shows the same as FIG. 15 in another embodiment.
Figure 19:
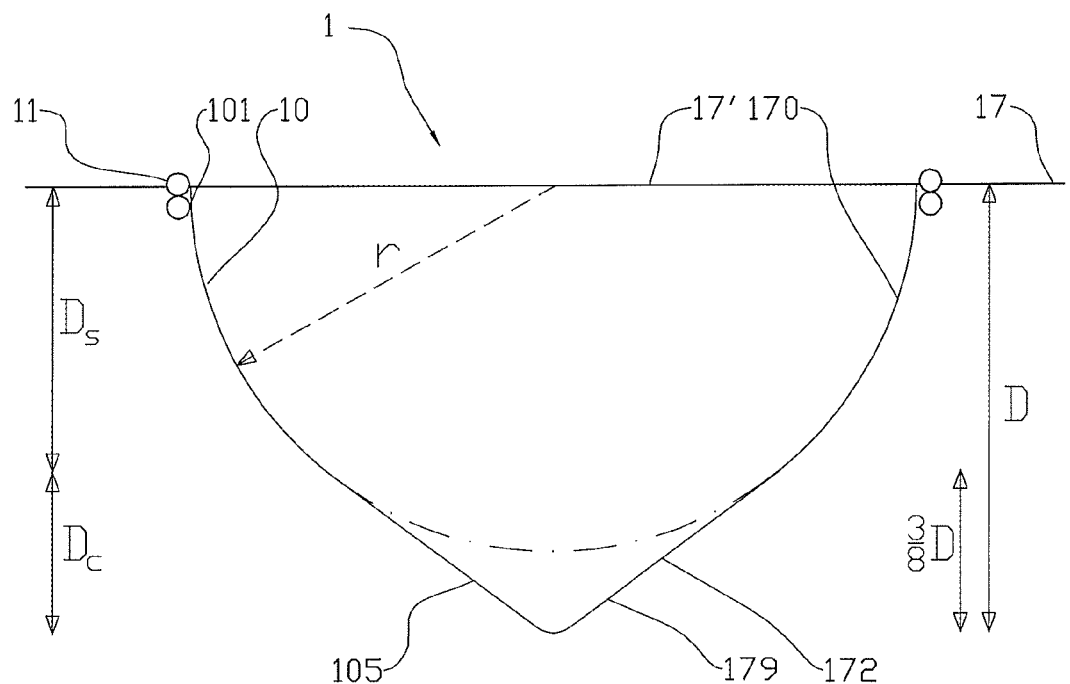
FIG. 19 shows the same as FIG. 15 in another embodiment.

In one embodiment, the length of the imaginary radius r of the spherical, upper portion 170 may substantially coincide with the depth D of the fish pen 1 as shown in FIGS. 15-16. In another embodiment, the length of the imaginary radius r of the spherical, upper portion 170 may be shorter than the depth D of the fish pen 1 as shown in FIGS. 17-19. It may be advantageous that the conical, lower portion 179 of the fish pen 1 meets the spherical, upper portion 170 tangentially, as shown in FIGS. 17-19. This has the advantage of there being an even transition between the upper portion 170 and the lower portion 179 of the fish pen 1.

In one embodiment, the conical, lower portion 179 of the fish pen 1 may exhibit a depth $D_C$ which constitutes substantially one half of the depth D of the fish pen 1 as shown in FIGS. 15 and 17. In an alternative embodiment, the conical, lower portion 179 of the fish pen 1 may exhibit a depth $D_C$ which constitutes practically one fourth of the depth D of the fish pen 1 as shown in FIGS. 16 and 18. In a further alternative embodiment, the conical, lower portion 179 of the fish pen 1 may exhibit a depth $D_C$ which constitutes practically ⅜ of the depth D of the fish pen 1 as shown in FIG. 19. In further embodiments, the conical portion 179 may exhibit a depth $D_C$ constituting from one fourth to one half of the depth D of the fish pen 1.

Figure 20:
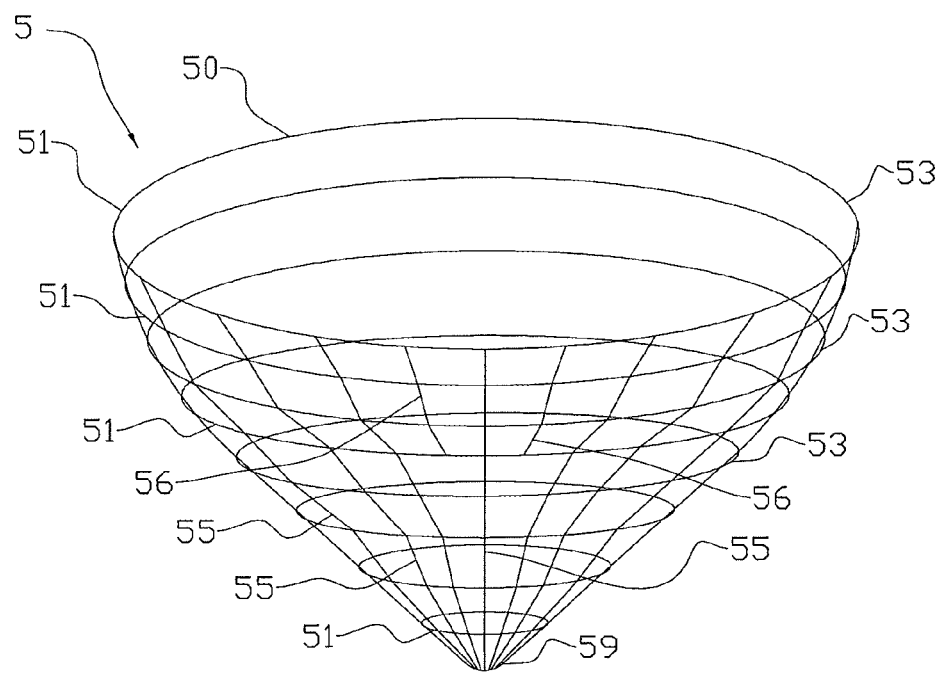
FIG. 20 shows a schematic view, on a different scale, of a guard net for a closed fish pen.

FIG. 20 shows schematically a guard net 5 for a closed fish pen 1, the wall of the fish pen 1 comprising a soft material in cloth form. The guard net 5 includes a plurality of straps 51 side by side, substantially horizontal in the position of application. Each horizontal strap 51 may form a horizontal ring 53. The diameter of the rings 53 decreases from the upper portion 50 of the guard net 5 to the lower portion 59 of the guard net 5. A plurality of vertical straps 55, 56 extend at least from one ring 53 to a neighbouring ring 53, and each vertical strap 55, 56 is secured to each of them. The straps 53, 55, 56 may be secured to each other by a seam. Some vertical straps 55 extend continuously from the upper portion 50 of the guard net 5 to the lower portion 59 of the guard net 5. Other vertical straps 56 extend only over a portion of the guard net 5. For the sake of exposition, the vertical straps 55, 56 have been drawn only in half the circumference of the guard net 5.

The straps 53, 55, 56 of the guard net 5 may consist of broad bands. Lifting straps of a kind known per se are suitable for the purpose. At its lower portion 59, the guard net 5 is provided with fastening means of a kind known per se for attachment to the outlet system of the fish pen 1. The outlet system may include an outlet basin 4, and the vertical straps 55 may be attached to the mounting collar 43 of the outlet basin 4. At its upper portion 50, the guard net 5 is provided with fastening means of a kind known per se for the adjustable attachment of the guard net 5 to the buoyancy system 11 of the fish pen 1. The guard net 5 may be tightened or slackened vertically relative to the buoyancy system 11.

The guard net 5 is joined together in such a way that the lengths of the horizontal straps 51 and the vertical straps 55, 56 are matched to the outer geometry of a closed fish pen 1 when the fish pen 1 is filled with water. The outer geometry of the closed fish pen 1 may be composed of a spherical, upper portion 170 and a conical lower portion 179. The guard net 5 is positioned on the outside of a closed fish pen 1. The guard net 5 stabilizes the shape of the closed fish pen 1 in which the walls comprise a soft material in cloth form. The guard net 5 also relieves the cloth 105 of a closed fish pen 1 so that it can resist larger forces before tearing.

The inlet system 2 of the fish pen 1 includes a pump 20 as shown in FIG. 22. The pump 20 is positioned inside the pump housing 21. The guiding channel 25 is in fluid communication, at its inlet end 250, with the outlet of the pump 20. The guiding channel 25 extends past the buoyancy system 11 and through the cloth 105 of the bag 10 and projects radially with it opposite, internal end 259 from the bag 10 on the inside of the bag 10 as shown in FIG. 25. The guiding channel 25 is extended in a fluid-sealing manner through the cloth 105. This may be done by the opening 106 of the cloth 105, see FIG. 25, being provided with a collar (not shown) on the outside of the cloth 105. The guiding channel 25 is extended through the collar. The collar may be sealed against the guiding channel 25 with a hose clamp, as it is known in the art. The fluid-tight lead-through of the guiding channel 25 in the cloth 105 has the advantage of surface water, which may contain pathogenic organisms, being unable to enter the fish pen 1 through the opening 106.

The internal end 259 of the guiding channel 25 is formed as a socket 258. A T-shaped pipe 26 is positioned, with its pipe-shaped leg 260, in the socket 258. The socket 258 and the leg 260 are provided with means of a kind known per se which prevent the T-shaped pipe 26 from being able to rotate around its longitudinal axis in the socket 258. Such means may include welding, locking bolts or lugs and associated grooves, for example. The T-shaped pipe 26 is provided with a tubular head 269 as shown in FIG. 23A. The head 269 has a longitudinal axis which is perpendicular to the longitudinal axis of the leg 260. The head 269 forms a sleeve 269. In one side wall, the sleeve 269 is provided with an inlet (not shown) complementarily fitting the tubular leg 260. The sleeve 269 is welded to the leg 260 in a fluid-tight manner.

An elongated current-creation pipe 6 is extended with its upper end portion 60 into and through the sleeve 269. The current-creation pipe 6 may be rotated around its longitudinal axis in the sleeve 269. On its outer jacket, the current-creation pipe is provided with an upper stop ring 61 and a lower stop ring 63. In the position of application, the upper stop ring 61 is positioned above the sleeve 269. The lower stop ring 63 is positioned below the sleeve 269 in the position of application. The stop rings 61, 63 have the function of not allowing the current-creation pipe 6 to be displaced vertically up or down in the sleeve 269.

Figure 23:
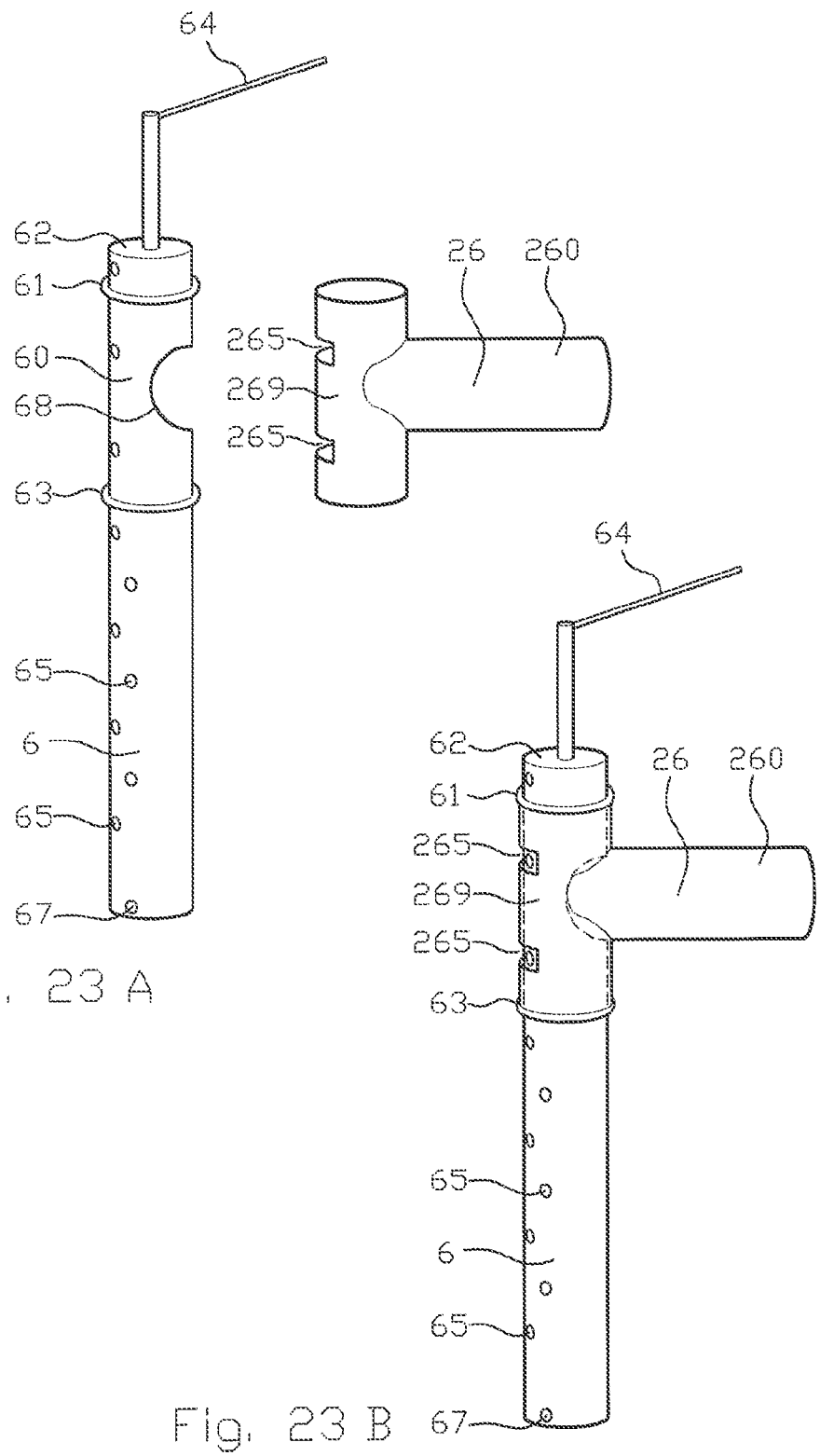
FIGS. 23A-23B show schematic side views, on a different scale, of a current-creation pipe and a guiding channel of the inlet system.
Figure 24:
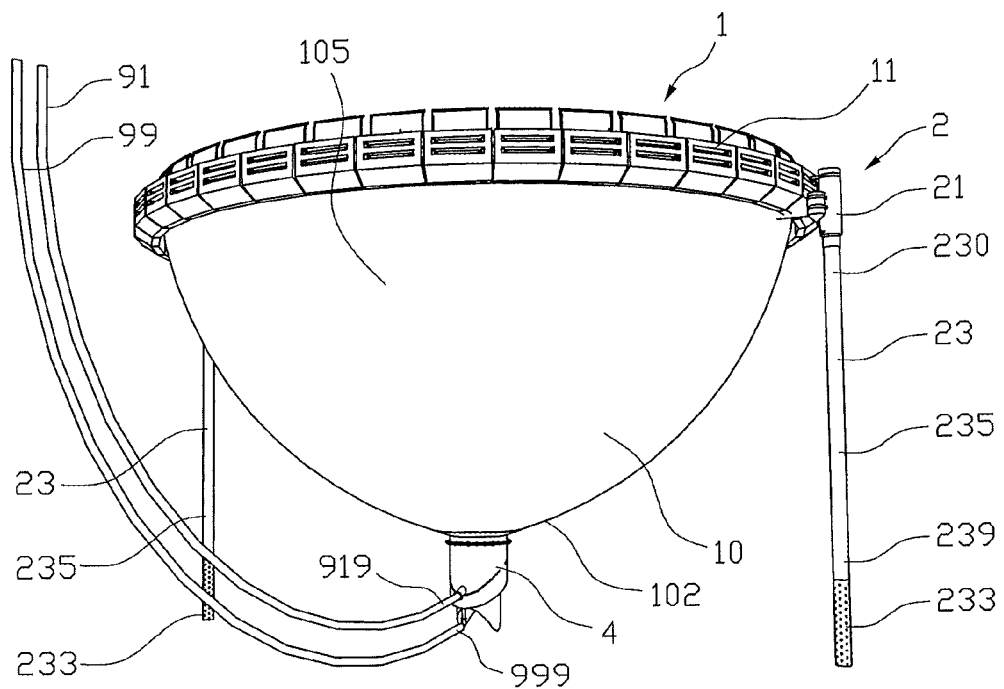
FIG. 24 shows a perspective view, on a different scale, of a closed fish pen provided with an inlet system, an outlet basin and hoses from the outlet basin to the surface, viewed somewhat from below.

The current-creation pipe 6 is provided with a plurality of openings 65 arranged in one or more rows 67 of holes on the surface of the current-creation pipe 6. The at least one row 67 of holes is oriented along the longitudinal direction of the current-creation pipe 6. Fluid may flow from the inner channel of the current-creation pipe 6 out through the openings 65. The upper end portion 60 of the current-creation pipe 6 is provided with a sealing lid 62. The upper end portion 60 of the current-creation pipe 6 is further provided with an operating means 64 as shown in FIG. 23. The operating means 64 may be operated manually or by means of an actuator (not shown) of a type known per se. Operating the operating means 64 makes the current-creation pipe 6 rotate around its longitudinal axis. In a portion of the pipe wall between the upper stop ring 61 and the lower stop ring 63, the current-creation pipe 6 is provided with a through-going, ovally shaped opening 68. The opening 68 has a height corresponding to the diameter of the internal channel of the leg 260 and the inlet of the sleeve 269. The opening 68 has a length that is larger than the height so that the opening 68 does not obstruct the fluid flow through the T-shaped pipe 26 when the current-creation pipe 6 is rotated by means of the operating means 64. The sleeve 269 and the current-creation pipe 6 are provided with means of a kind known per se (not shown) reducing the freedom of rotation of the current-creation pipe 6 so that a portion of the opening of the current-creation pipe 6 will always correspond to the inlet of the sleeve 269. The current-creation pipe 6 may be turned into a position in which a beneficial water circulation is set up inside the fish pen 1. The water circulation depends on the amount of water flowing through the inlet system 2, the pressure of the water, the diameter and volume of the fish pen 1, the velocity of the water flowing out of the current-creation pipe 6 and the size and positioning of the openings 65, among other things. The fish pen 1 may be provided with more than one inlet system 2 as shown in FIGS. 24 and 25.

The T-shaped pipe 26 may optionally be provided with at least one internal floating body 283. The current-creation pipe 6 hangs on the T-shaped pipe 26 and on the guiding channel 25 and without any support from the bag 10 of the fish pen 1. The floating body 283 counteracts deflection forces on the T-shaped pipe 26 and the guiding channel 25.

The openings 65 may be formed in a circular shape, in an oval shape or in the shape of elongated slots. The row 67 of holes may extend from the lower end portion 69 of the current-creation pipe 6 to the lower stop ring 63. In the embodiment shown, the row 67 of holes extends from the lower end portion 69 of the current-creation pipe 6 past the upper stop ring 61. Diametrically opposite the inlet, the sleeve 269 is provided with slots 265 into which the openings 65 positioned between the stop rings 61 and 63 lead. In the portion between the opening 68 and the upper stop ring 61, and in the portion between the opening 68 and the lower stop ring 63, the current-creation pipe 6 is provided with sealing elements, such as O-rings, sealing the annular space between the current-creation pipe 6 and the sleeve 269. At its lower portion 69, the current-creation pipe 6 is provided with a sealing lid (not shown) so that water may exit the current-creation pipe 6 only through the openings 65.

An alternative current-creation pipe 6' is shown in FIG. 26. The current-creation pipe 6' is attached in its upper portion 60' to the guiding channel 25 so that water may flow through the guiding channel 25 into the current-creation pipe 6' through an opening 68'. The current-creation pipe 6' is provided with a plurality of openings 65' in a row 67' of holes in the surface of the current-creation pipe 6'. The openings 65' have a length along the circumference of the current-creation pipe 6' that may be the same as or larger than the width of the openings 65' along the longitudinal direction of the current-creation pipe 6'. The openings 65' may have a rectangular shape as shown in FIG. 26.

Figure 27A:
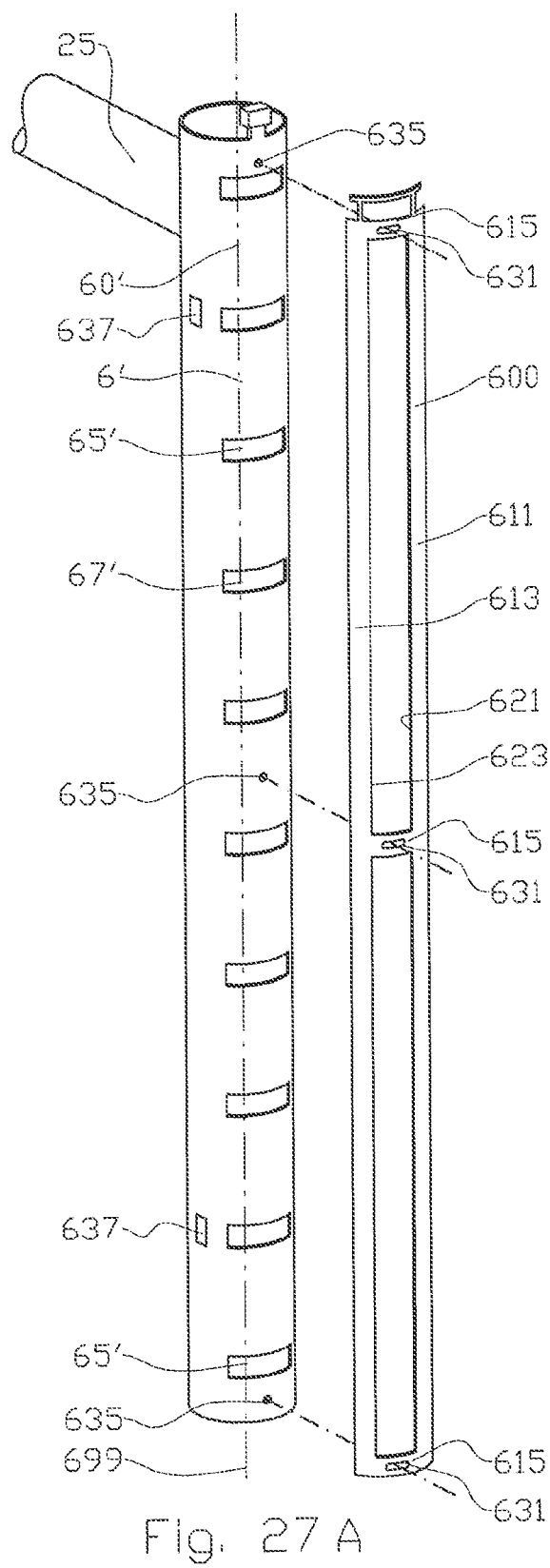
FIGS. 27A-27B show the current-creation pipe with a turnable damper, on the same scale as FIG. 26.
Figure 27B:
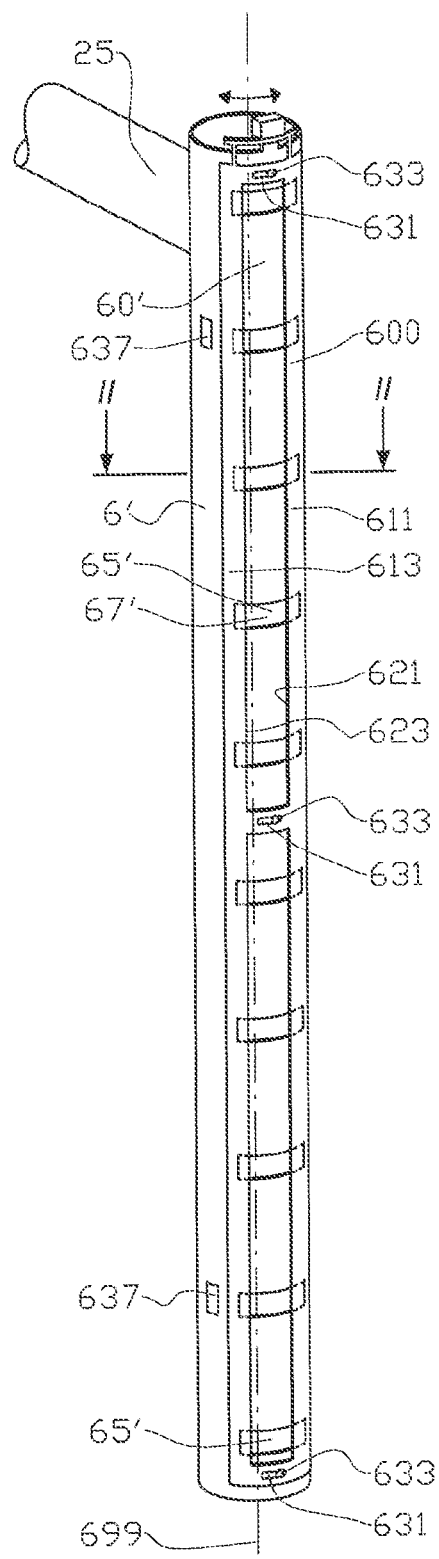
Figure 29A:
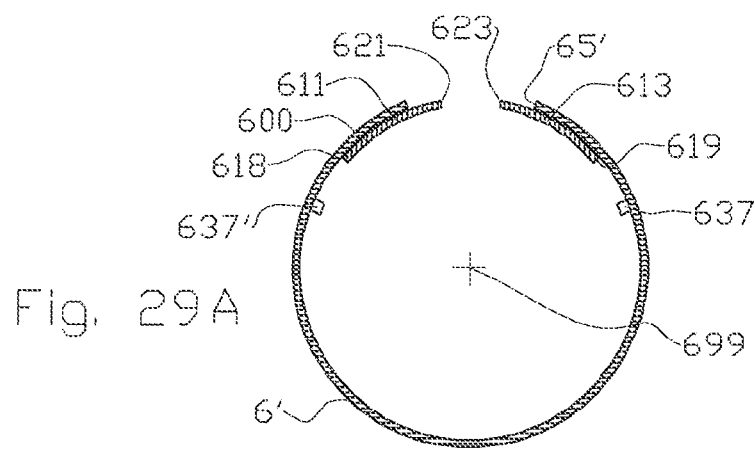
FIGS. 29A-29C show an alternative embodiment having the damper on the inside of the current-creation pipe, on the same scale as FIG. 28.
Figure 29B:
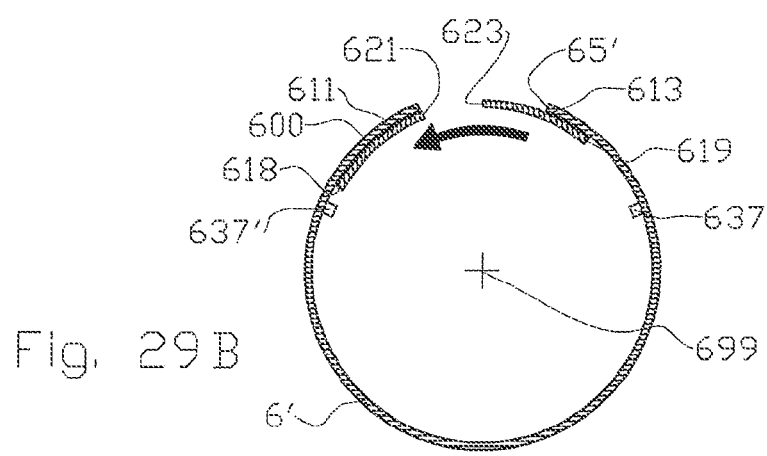
Figure 29C:
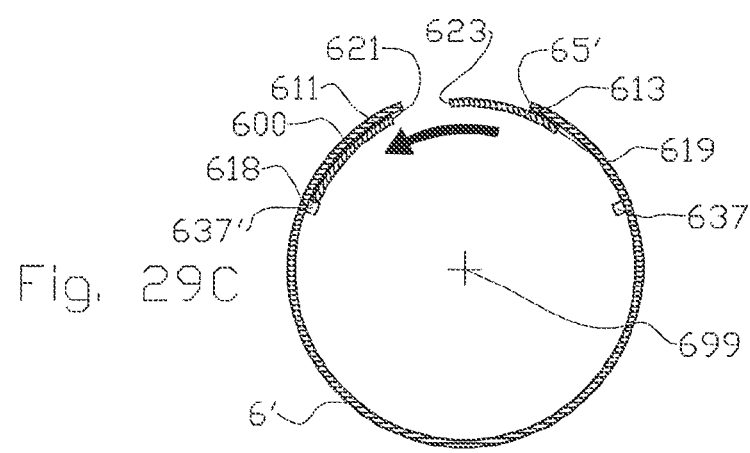

In one embodiment, the current-creation pipe 6' may be provided with a damper member 600 as shown in FIG. 27. The damper member 600 includes a first side plate 611 and a second side plate 613. The side plates 611, 613 extend in the longitudinal direction of the current-creation pipe 6'. The distance between the opposite edges of the side plates 611, 613, the edge 621 and edge 623, respectively, is shown as shorter than the width of the opening 65', but the distance may also be the same as the width of the opening 65' or larger than the width of the opening 65'. Transverse plates 615 between the side plates 611, 613 keep the distance between the side plates 611, 613. The transverse plates 615 are provided with through openings 631. The openings 631 have a longitudinal direction along the circumference of the current-creation pipe 6'. A screw 633 may be passed through the opening 631 and secured in a threaded hole 635 in the surface of the current-creation pipe 6'. On its outer surface, the current-creation pipe 6' is provided with stops 637 on either side of the row 67' of holes. By means of an operating means (not shown), the damper member 600 may be rotated from side to side around the longitudinal axis 699 of the current-creation pipe 6' until either the outer edge 618 of the side plate 611 or the outer edge 619 of the side plate 613 hits the stop 637, 637'. This is shown in FIG. 28. The screw 633 in the opening 631 will also restrict the rotational movement of the damper member 600. The damper member 600 may be positioned on the outside of the current-creation pipe 6' as shown in FIGS. 27 and 28. In an alternative embodiment, the damper member 600 may be positioned on the inside of the current-creation pipe 6' as shown in FIG. 29.

An alternative damper member 600' is shown in FIG. 30A. The damper member 600' includes a first side plate 611' and a second side plate 613'. The side plates 611', 613' extend in the longitudinal direction of the current-creation pipe 6'. The distance between the opposite edges of the side plates 611', 613', the edge 621' and 623' respectively, is shown as shorter than the width of the opening 65', but the distance may also be the same as the width of the opening 65' or larger than the width of the opening 65'. Belly bands 616 between the side plates 611, 613 keep the distance between the side plates 611, 613. The belly band 616 extends around the circumference of the current-creation pipe 6'. The number of belly bands 616 is matched to the number of openings 65' in the current-creation pipe 6'. By means of an operating means (not shown), the damper member 600' can be rotated from side to side around the longitudinal axis 699 of the current-creation pipe 6' until either the outer edge 618' of the side plate 611' or the outer edge 619' of the side plate 613' hits the stop 637, 637'. By means of a second operating means (not shown), the damper member 600' may be moved axially in a first direction along the longitudinal axis of the current-creation pipe 6' so that a portion of the belly band 616 covers a portion of the opening 65'. The damper member 600' may be displaced in a second direction along the longitudinal axis of the current-creation pipe 6' so that the entire belly band 616 is positioned either above or below the opening 65' when the damper member 600' is in an open position. The belly band 616 may be so wide that it covers the entire opening 65' when the damper member 600' is in a closed position. Some of the belly bands 616 may be replaced by transverse plates 615' (not shown).

An alternative damper member 600" is shown in FIG. 30C. The damper member 600" is provided with a bracing plate 617. The bracing plate 617 extends in the longitudinal direction of the current-creation pipe 6' and connects the belly bands 616. In the position of application, when the damper member 600' surrounds the current-creation pipe 6', the bracing plate 617 will be positioned on the diametrical side of the current-creation pipe 6' relative to the row 67' of holes.

A further alternative damper member 650 is shown in FIG. 31. The damper member 650 includes a plate 651 which is displaceable in the longitudinal direction of the current-creation pipe 6' by means of a first operating means 660. The plate 651 may be displaced in guides 653 on the outer side of the current-creation pipe 6'. The movement of the plate 651 in the longitudinal direction is restricted by a stop 654 and by the operating means 660. The plate 651 is provided with a plurality of openings 655 corresponding to the openings 65' in shape and number. The opening 655 may be somewhat larger than the opening 65', but the opening may also be the same as the size of the opening 65' or be somewhat smaller than the size of the opening 65'. In one embodiment, the damper member 650 is provided with two rows of rudders 670 so that there is one rudder 670 on either side of each opening 665. Each rudder 670 is attached to the plate 651 by a hinge 656. The rudders 670 in a row 671 of rudders are connected at their free ends to a rod 673 in such a way that the rudders 670 in a row 671 of rudders have the same angle relative to the surface of the current-creation pipe 6'. The rod 673 of the first row 671 of rudders and the rod 673' of the second 671' row of rudders are connected by tie bars 674 so that the rudders 670 of the first row 671 of rudders move together with the rudders 670 of the second row 671' of rudders. The rows 671, 671' of rudders are moved by means of a second operating means 680. The first operating means 660 is shown as a pipe-in-pipe connection. An outer pipe 661 is fixed, whereas an inner pipe or alternatively a solid, flexible rod 663 can be displaced within the outer pipe 661. The outer pipe 661 is fixed to the current-creation pipe 6' with a bracket 665. The inner pipe 663 is connected to the upper portion 659 of the plate 651. The inner pipe 663 may displace the plate 651 axially up and down along the surface of the current-creation pipe 6'. The second operating means 680 is shown as a pipe-in-pipe connection. An outer pipe 681 is fixed, whereas an inner pipe or alternatively a solid, flexible rod 683 can be displaced within the outer pipe 681. The outer pipe 681 is fixed to the current-creation pipe 6' with a bracket 685. The inner pipe 683 is connected to one of the tie bars 674. The inner pipe 681 may displace the tie bar 674 sideways to both sides relative to the opening 65'. Both rows 671, 671' of rudders are thereby rotated relative to the opening 65'. An alternative damper member 650' is shown in FIG. 32. In this alternative embodiment, the damper member 650' includes one row 671" of rudders. The row 671" of rudders is positioned in a centered manner over the openings 655. The inner pipe 683 is attached to the rod 673.

The operating means 660, 680 may be composed of other types of actuators, such as electric ones, pneumatic ones or hydraulic ones, as it is known within the art.

When the damper member 600 shown in FIG. 27 is turned as shown in FIG. 28 or 29, one of the side plates 611, 613 will cover a portion of the opening 65'. The flow direction of the water out of the current-creation pipe 6' is determined by the position of the side plate 611, 613. The flow rate of the water out of the current-creation pipe 6' increases when a portion of the opening 65' is covered by one of the side plates 611, 613. With the damper member 600 it is thereby achieved that the flow direction of the water can be controlled.

When the damper member 600' shown in FIG. 30 is turned, the same as what was described for the damper member 600 is achieved. When the damper member 600' is displaced along the longitudinal axis of the current-creation pipe 6', a portion of the belly band 616 will be displaced in over the opening 65' and the flow rate of the water out of the current-creation pipe 6' increases. With the damper member 600' it is thereby achieved that the flow direction of the water and the flow rate of the water can be controlled independently of each other. The same is achieved with the alternative damper members 650 and 650' as well. The damper members 650, 650' are displaced in the longitudinal direction of the current-creation pipe 6' so that the opening 655 in the plate 651 is displaced relative to the opening 65'. A portion of the opening 65' is thereby covered by the plate 651. The rudders 670 control the flow direction of the water. Positioning each rudder 670 in a centered manner over each opening 655 has proved beneficial. This reduces the number of rudders while, at the same time, the rudder 670 is subjected to smaller forces than rudders 670 that are positioned at the side of the opening 655.

Figure 33A:
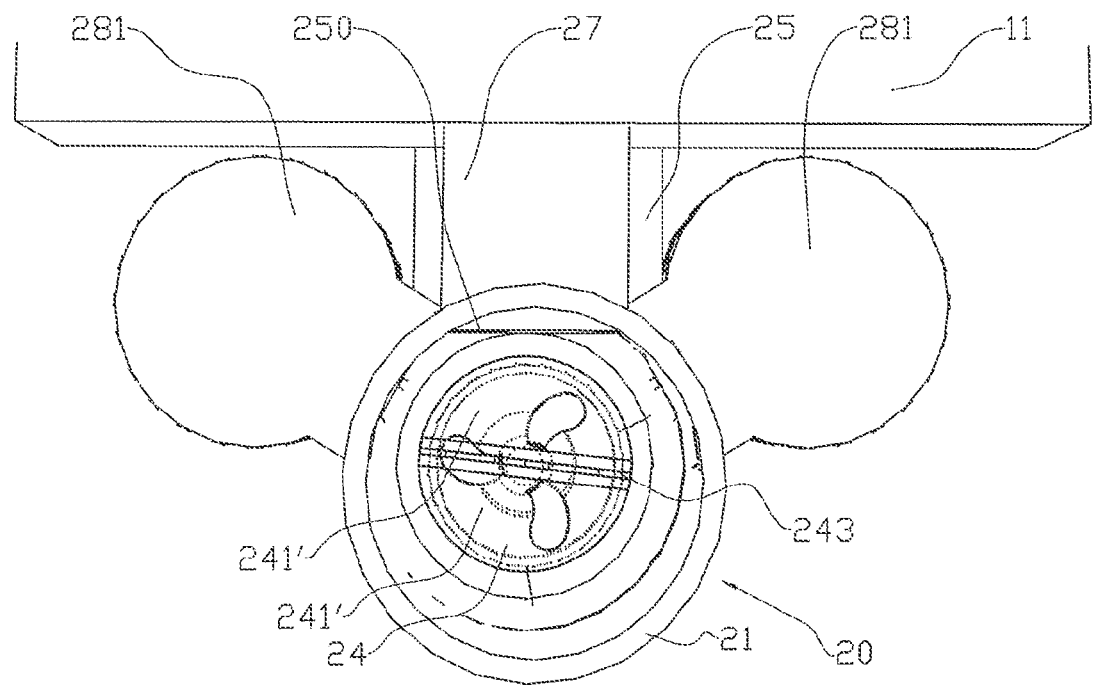
FIG. 33A-33B shows an alternative embodiment of the pump housing of the inlet system, on a different scale, 33A) with a damper in a closed position, 33B) with the damper in the open position.
Figure 33B:
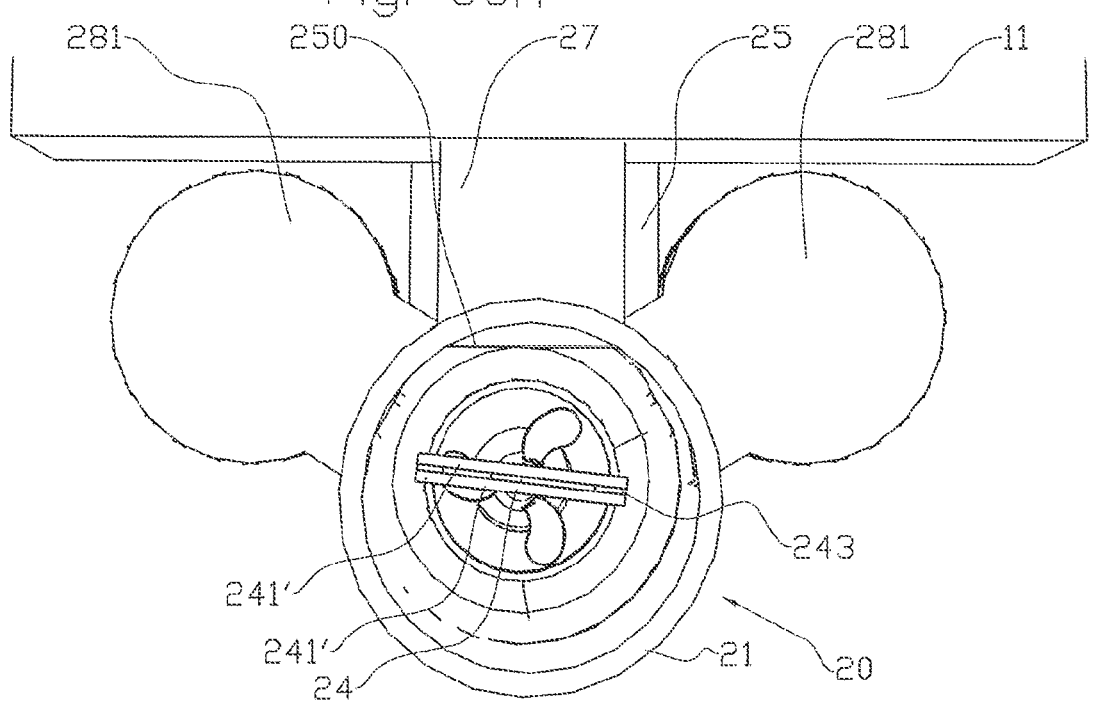

In one embodiment, the pump housing 21 may be provided with a damper 24. The damper 24 is positioned between the outlet of the pump 20 and the inlet end 250 of the guiding channel 25 as shown in FIG. 33. The damper 24 is formed as a check valve with two flaps 241, 241'. The flaps 241, 241' are connected to a hinge 243 extending diagonally across the inside of the pump housing 21. When the pump 20 displaces water up through the pump housing 21 into the inlet end 250 of the guiding channel 25, the flaps 241, 241' are facing upwards as shown in FIG. 33B. When the pump 20 stops, the flaps 241, 241' will drop back into a closed position, as shown in FIG. 33A, so that water is substantially prevented from flowing from the guiding channel 25, down into the pump housing 21, past the pump 20 and further down into the supply channel 23.

The external supply channel 23 of the inlet system 2, leading into the inlet of the pump 20 at its upper portion 230, may be provided with a strainer 233 in its inlet portion 239. The strainer 233 may include a strainer pipe 233 of a kind known per se. In one embodiment, the supply channel 23 may include a length-adjustable channel 235 in a portion between the upper portion 230 and the inlet portion 239. The length-adjustable channel 235 may include a channel wall in an elastic polymer material, there being a spiral in a rigid material housed in the channel wall. The rigid material may consist of a metal such as steel. The rigid material may consist of a polymer such as PVC. Such a length-adjustable channel 235 may, for example, be effectively 1.5 long in its contracted state and effectively 22 m long in its extended state. A weight (not shown) is attached to the strainer pipe 233. A rope or a wire (not shown) is attached to the strainer pipe 233 and extend up to the buoyancy system 11. The rope or wire may extend on the outside of the supply channel 23. The rope or wire may extend substantially on the inside of the supply channel 23. The supply channel 23 has the advantage of the length-adjustable channel 235 giving the supply channel 23 sideways flexibility so that the supply channel can yield somewhat to water currents. The supply channel 23 further has the advantage of the effective length of the length-adjustable channel 235 being easily and quickly adjustable by either letting out rope or wire to the strainer pipe 233 or hauling in rope or wire. It is thereby achieved that the vertical position of the strainer pipe 233 is deep enough for salmon-louse larvae, for example, not to get into the fish pen 1 with the intake water. It is also achieved that the strainer pipe 233 may be positioned at a depth where the water temperature is favourable so that the best possible growth is achieved for the fish in the fish pen 1.

Figures 38A, 38B:
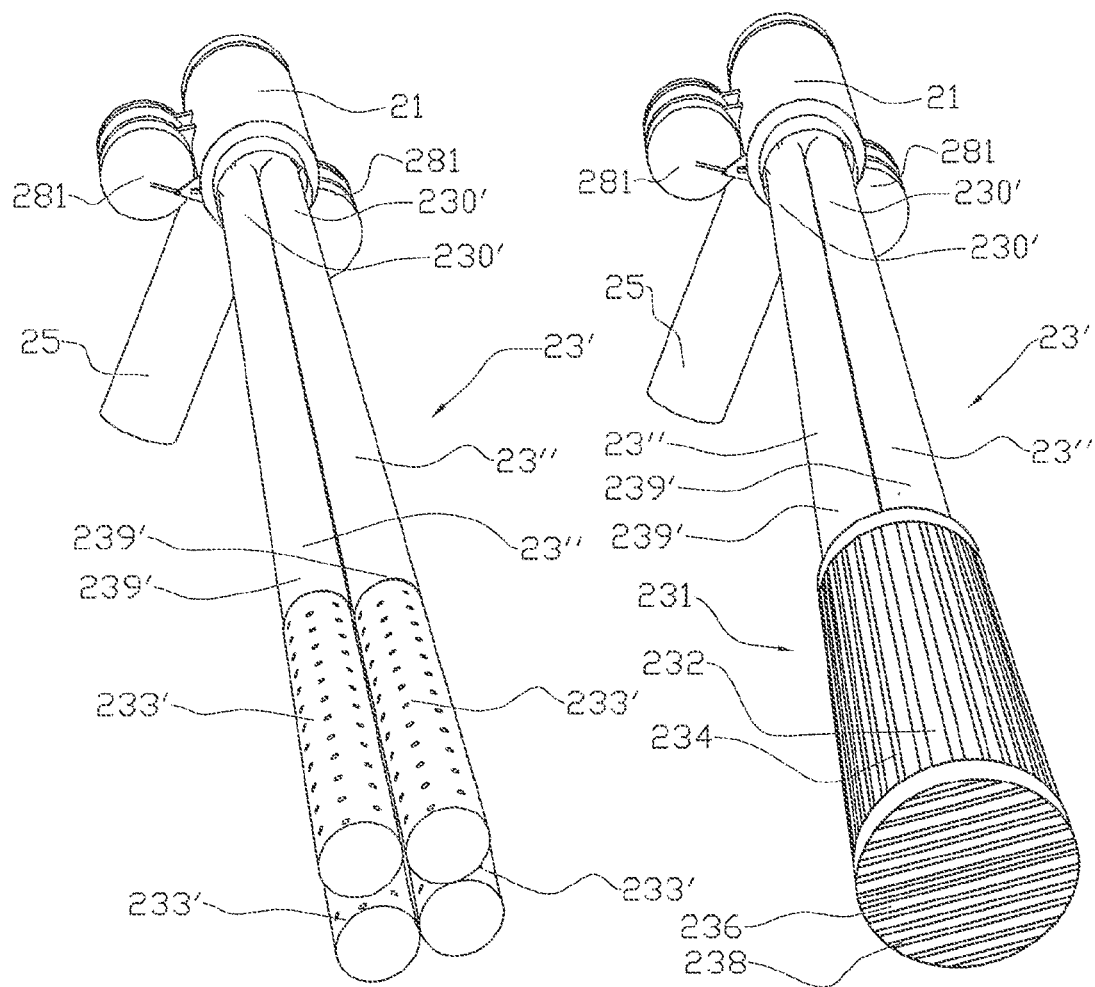
FIGS. 38A-B show an alternative embodiment of the supply channel of the inlet system, on a different scale, with two embodiments of a strainer pipe.

An alternative external supply channel 23' is shown in FIG. 38. The supply channel 23' includes a plurality of separate supply channels 23". In FIG. 37, four supply channels 23" are shown. The number of supply channels 23" may be three, or more than four. Each supply channel 23" is provided with a strainer pipe 233' at its inlet portion 239', as shown in FIG. 38A. The upper portion 230' of the supply channel 23' is connected to the pump housing 21 and in fluid communication with the pump 20. The supply channels 23" may be attached to each other by one or more bands (not shown) between the upper portions 230' and the inlet portions 239' of the supply channels 23".

Compared with one alternative supply channel with the same cross section as the total cross section of the supply channels 23', a plurality of thinner supply channels 23" has the advantage of allowing the water flow from the desired depth to be maintained even if there should be damage to one of the supply channels 23" or one of the supply channels should become clogged, for example in the strainer pipe 233'. Thinner supply channels 23' also have the advantage of being more flexible in a water flow so that the strain on the attachment to the pump housing 21 will be smaller. The strain on the mounting bracket 27 of the pump housing 21 will be smaller as well. An alternative embodiment of the inlet portions 239' of the supply channels 23' is shown in FIG. 39B. In this embodiment, the strainer pipe 233' of each single supply channel 23" has been replaced with a shared strainer chamber 231 to which the inlet portions 239' are attached. The strainer chamber 231 is formed from pipes or ribs 232 standing side by side in a circumference and forming slots 234 between them. In the position of application, the pipes 232 have a substantially vertical orientation. The strainer chamber 231 is further formed from pipes or ribs 236 side by side, forming slots 238 between them, and the pipes 236 form a bottom in the strainer chamber 231.

In the FIGS. 21, 22 and 24, 25, an alternative buoyancy system 11 as described in the patent publication NO20111704/WO2013085392 is shown. The inlet system 2 described can be used together with various buoyancy systems 11 as shown, and is not restricted to being used together with the buoyancy systems 11 shown either. For example, the inlet system 2 may be used together with known buoyancy systems including concentric rings side by side.

In FIG. 25, an oxygenation system 8 is shown inside the fish pen 1. The oxygenation system 8 may include channels with holes.

The invention claimed is:

1. A system having a strainer regulator for a strainer in a closed fish pen, wherein the system comprises:
    a closed fish pen, wherein an outlet basin having an outlet channel is formed in a bottom portion of the closed fish pen;
    a strainer configured to cover a cross section of the outlet channel and having an effective straining area;
    a regulator sleeve displaceably positioned on an outside of the strainer and adapted to increase or reduce the effective straining area and water flow through the strainer; and
    a control mechanism configured to displace the regulator sleeve, where the control mechanism comprises an actuator which is attached to the regulator sleeve.

2. The system according to claim 1, where the actuator extends from the regulator sleeve through the strainer, and through the outlet channel to a water surface on the outside of the fish pen.

3. The system according to claim 2, where the actuator includes a pipe or a rod within a guide pipe.

4. The system according to claim 3, where the guide pipe is attached to an inside of the outlet channel.

5. A system having a strainer regulator for a strainer in a closed fish pen, wherein the system comprises:
    a closed fish pen, wherein an outlet basin having an outlet channel is formed in a bottom portion of the closed fish pen;
    a strainer configured to cover a cross section of the outlet channel and having an effective straining area;
    a regulator sleeve displaceably positioned on the outside of the strainer and adapted to increase or reduce the effective straining area and water flow through the strainer; and
    a control mechanism configured to displace the regulator sleeve, wherein the control mechanism comprises a wire coupled to the regulator sleeve.

6. The system according to claim 5, where the wire extends from the regulator sleeve to a first pulley and over the first pulley to a first winch, the first winch being able to displace the regulator sleeve by varying a free length of the wire.

7. The system according to to claim 6, where the strainer regulator further includes:
    a second winch positioned on a side of the fish pen diagonally opposite the first winch; and
    a centering wire extending from the second winch to a block housing the first pulley.

8. The system according to claim 5, where the wire extends from the regulator sleeve to a first pulley and over the first pulley to a buoy positioned on an inside of the fish pen, the buoy being able to displace the regulator sleeve by varying a pulling force on the wire.

9. The system according to claim 8, where the wire extends from the first pulley to and over a second pulley, up to and over a third pulley and up to the buoy; the second pulley positioned at a side edge of the fish pen; and the third pulley positioned submergedly at the side edge of the fish pen.

10. The system according to claim 9, where the strainer regulator further includes a block that is attached the wire, and the wire comprises at least three lines, where the at least three lines extend over the fish pen and attach to each other at a middle portion of the fish pen.

* * * * *